United States Patent
Clevorn

(10) Patent No.: US 9,319,177 B2
(45) Date of Patent: Apr. 19, 2016

(54) RADIO COMMUNICATION DEVICES AND METHODS FOR CONTROLLING A RADIO COMMUNICATION DEVICE

(75) Inventor: Thorsten Clevorn, Munich (DE)

(73) Assignee: INTEL DEUTSCHLAND GMBH, Neubiberg (DE)

( * ) Notice: Subject to any disclaimer, the term of this patent is extended or adjusted under 35 U.S.C. 154(b) by 0 days.

(21) Appl. No.: 13/564,915

(22) Filed: Aug. 2, 2012

(65) Prior Publication Data

US 2013/0029720 A1     Jan. 31, 2013

Related U.S. Application Data

(63) Continuation-in-part of application No. 13/106,925, filed on May 13, 2011, and a continuation-in-part of application No. 13/105,069, filed on May 11, 2011.

(51) Int. Cl.
| | |
|---|---|
| *H04M 1/00* | (2006.01) |
| *H04L 1/00* | (2006.01) |
| *H04L 1/02* | (2006.01) |
| *H04W 88/06* | (2009.01) |

(52) U.S. Cl.
CPC ............... *H04L 1/0036* (2013.01); *H04L 1/02* (2013.01); *H04W 88/06* (2013.01)

(58) Field of Classification Search
CPC ........ H04L 1/0036; H04L 1/02; H04W 88/06
See application file for complete search history.

(56) References Cited

U.S. PATENT DOCUMENTS

| 7,047,025 B2 | 5/2006 | Jung |
| 2004/0042531 A1 | 3/2004 | Arikan et al. |
| 2004/0204035 A1 | 10/2004 | Raghuram et al. |
| 2005/0007977 A1 | 1/2005 | Jou |
| 2006/0160564 A1 | 7/2006 | Beamish et al. |
| 2006/0165156 A1 | 7/2006 | Kanemoto et al. |
| 2006/0268789 A1 | 11/2006 | Yu et al. |

(Continued)

FOREIGN PATENT DOCUMENTS

| CA | 2598549 A1 | 2/2009 |
| CN | 102461326 A | 5/2012 |

(Continued)

OTHER PUBLICATIONS

QUALCOMM Incorporated; TP on Impact to UE Implementation due to HSDPA MP-Tx; 3GPP TSG RAN WG1 Meeting #65 R1-111547; May 9-13, 2011; 6 pages; Barcelona, Spain.

(Continued)

*Primary Examiner* — Keith Fang

(57) ABSTRACT

A radio communication device may be provided. The radio communication device may include: a first circuit; a second circuit; a processor configured to operate the radio communication device in a plurality of operation modes, wherein the plurality of operation modes may include: a first operation mode in which the first circuit processes received data of a first communication channel independent from the second circuit and in which the second circuit processes received data of a second communication channel independent from the first circuit; and a second operation mode in which the first circuit and the second circuit jointly process received data of a third communication channel. The radio communication device may further include a mode switching circuit configured to switch between the plurality of operation modes.

23 Claims, 17 Drawing Sheets

(56) References Cited

U.S. PATENT DOCUMENTS

| | | |
|---|---|---|
| 2007/0076663 A1 | 4/2007 | Qi et al. |
| 2008/0102880 A1 | 5/2008 | Gholmieh et al. |
| 2009/0103516 A1 | 4/2009 | Miyano et al. |
| 2009/0190645 A1* | 7/2009 | Li et al. ................. 375/229 |
| 2009/0213827 A1 | 8/2009 | Bitran et al. |
| 2009/0257487 A1 | 10/2009 | Wang et al. |
| 2009/0274079 A1 | 11/2009 | Bhatia et al. |
| 2009/0316575 A1 | 12/2009 | Gholmieh et al. |
| 2010/0034114 A1 | 2/2010 | Kim et al. |
| 2010/0062800 A1 | 3/2010 | Gupta et al. |
| 2010/0279709 A1* | 11/2010 | Shahidi et al. ........... 455/456.2 |
| 2010/0322291 A1 | 12/2010 | Kaikkonen et al. |
| 2010/0331019 A1 | 12/2010 | Bhattacharjee et al. |
| 2011/0044185 A1 | 2/2011 | Perraud et al. |
| 2011/0149947 A1 | 6/2011 | Kim et al. |
| 2011/0217969 A1* | 9/2011 | Spartz et al. ............. 455/422.1 |
| 2011/0319073 A1* | 12/2011 | Ekici et al. ............... 455/426.1 |
| 2012/0250625 A1* | 10/2012 | Kim et al. ................. 370/328 |

FOREIGN PATENT DOCUMENTS

| | | | |
|---|---|---|---|
| EP | 2146523 A1 | | 1/2010 |
| WO | 2010140781 A2 | | 12/2010 |
| WO | WO 2011040777 | * | 4/2011 |
| WO | 2012055434 A1 | | 5/2012 |

OTHER PUBLICATIONS

Interdigital Communications, LLC; Considerations for 4-carrier HSDPA DRX Design; 3GPP TSG-RAN WG1 Meeting #60Bis R1-102089; Apr. 12-16, 2010; 6 pages; Beijing, China.

Office action received for DE Patent Application No. 102013108279. 3, dated Oct. 8, 2014, 6 pages of office action and 4 pages of English translation.

Office Action received for CN Patent Application No. 201310333422.6, dated Feb. 19, 2016, 5 pages of Office Action (for information purposes only).

* cited by examiner

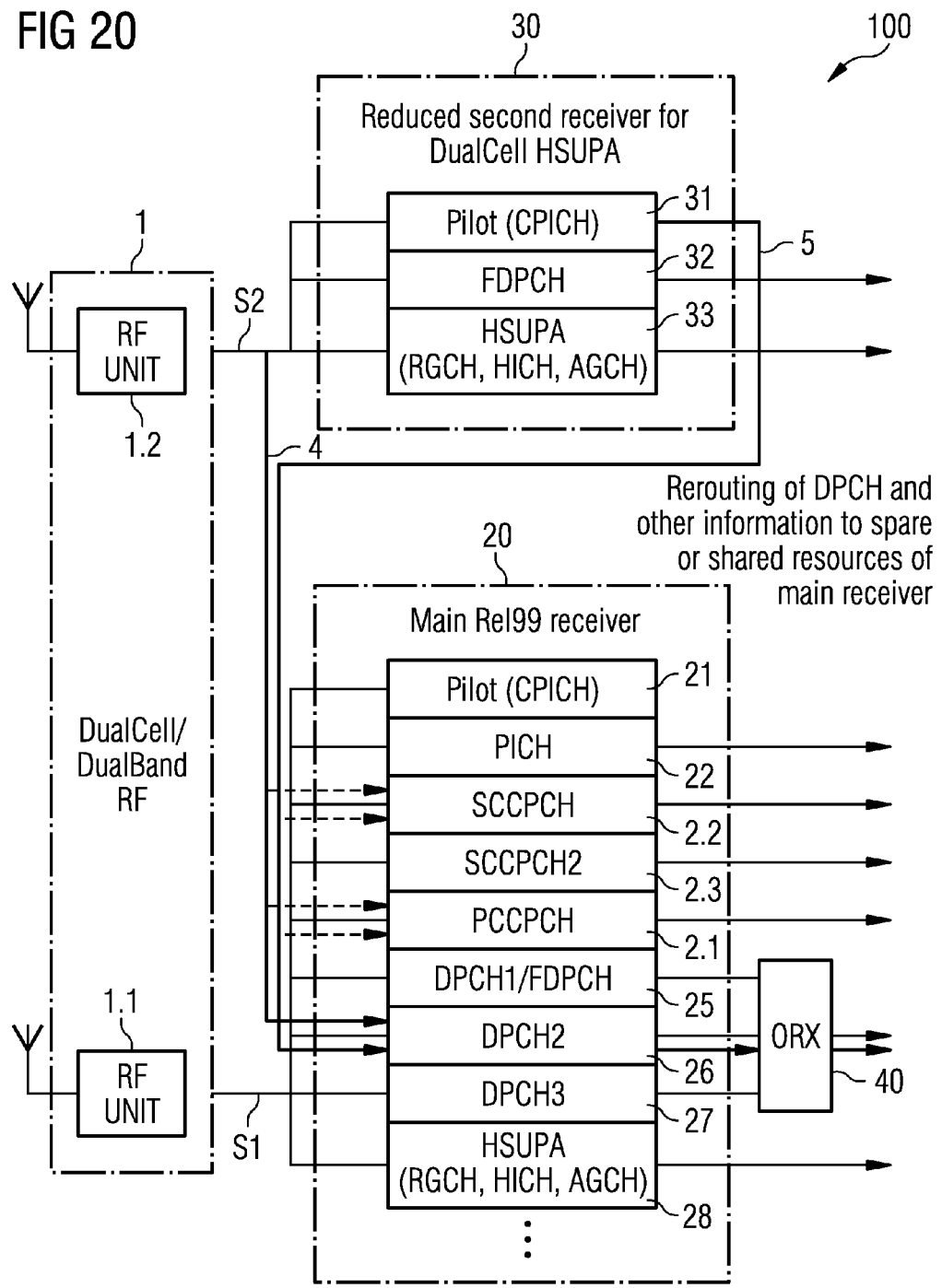

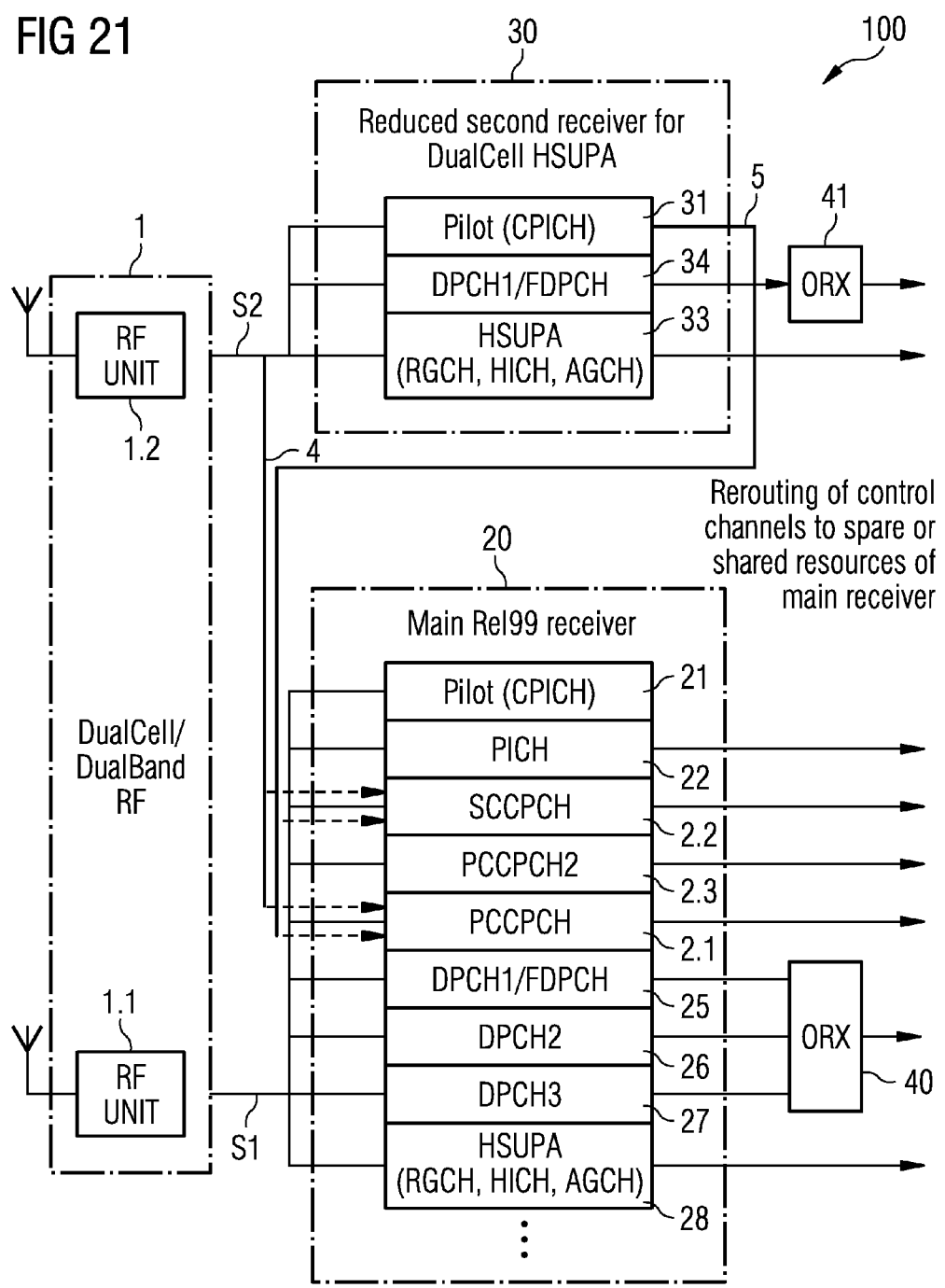

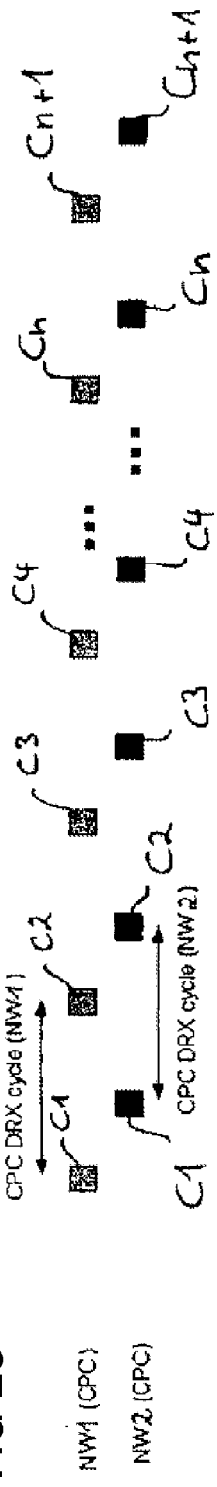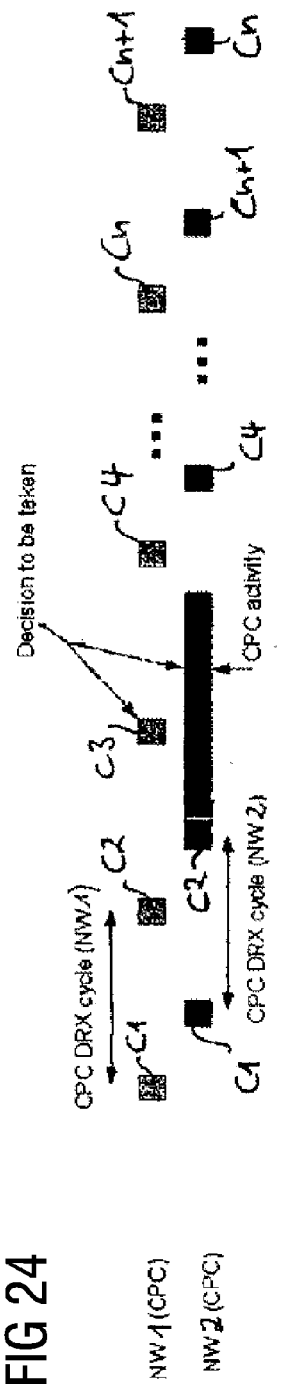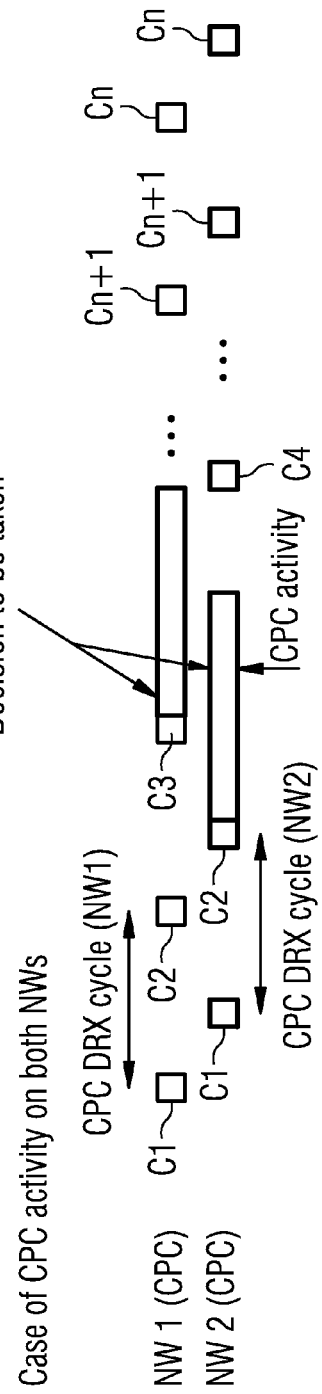

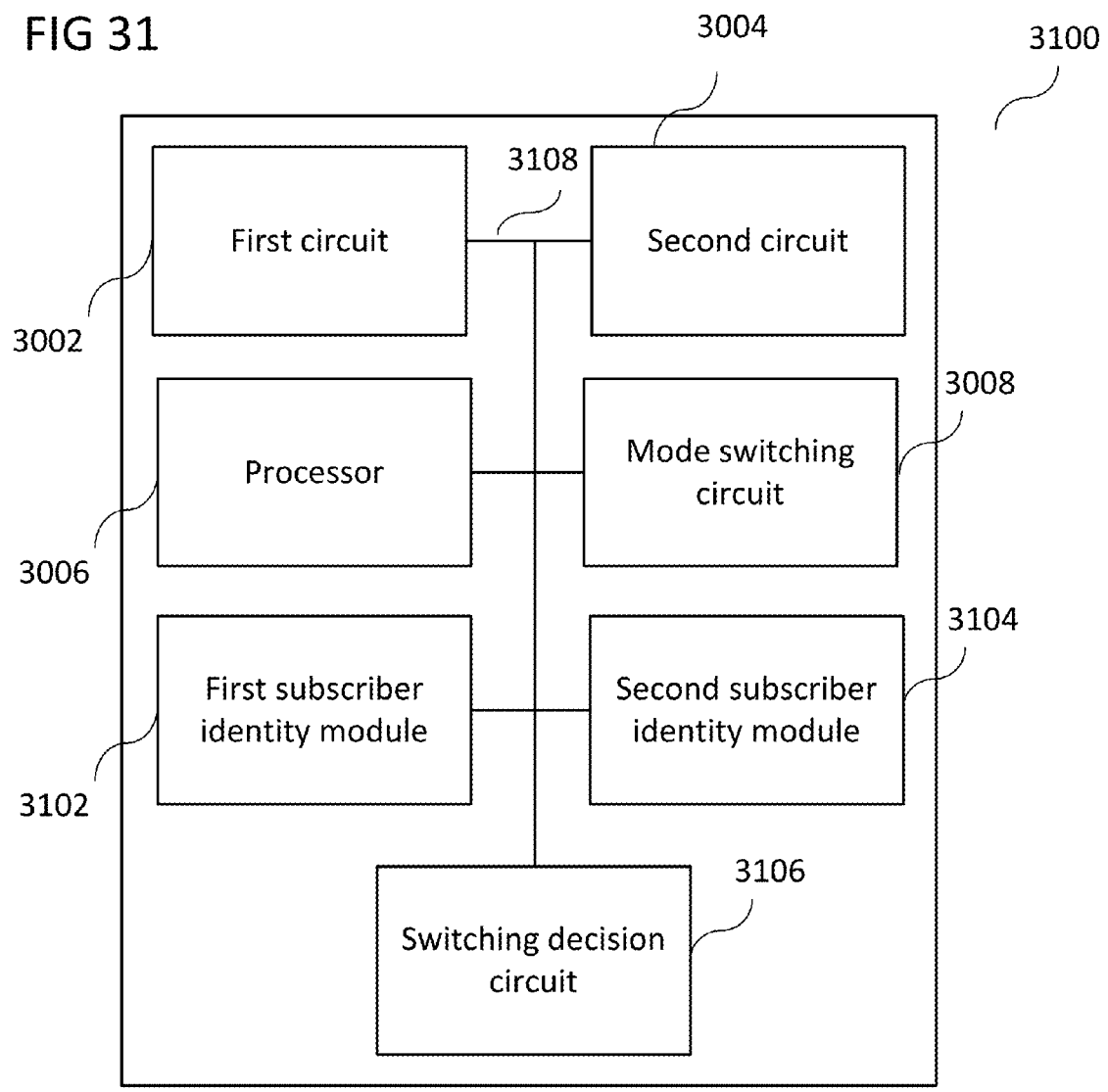

_US 9,319,177 B2_

RADIO COMMUNICATION DEVICES AND METHODS FOR CONTROLLING A RADIO COMMUNICATION DEVICE

CONTINUATION IN PART

This application is a continuation in part of U.S. Ser. No. 13/106,925 filed on May 13, 2011 and U.S. Ser. No. 13/105,069 filed on May 11, 2011.

TECHNICAL FIELD

Aspects of this disclosure relate generally to radio communication devices and methods for controlling a radio communication device.

BACKGROUND

Dual-SIM (subscriber identity module) may be provided in radio communication devices. A next step of possible Dual-SIM scenarios is to have two active connections in parallel, for example on two different networks. This may be denoted as Dual-SIM Dual-Transport (DSDT). Possible use cases may be to have a voice plan on one NW (network), a data plan on another NW, and the wish to do voice calls in parallel to a data connection. Or for example during travelling to another country, it may be desired to have the home SIM to receive calls under the known number, but to do data or voice in parallel on a cheaper (no roaming) local NW of the foreign country.

DSDT may be implemented in the UE (user equipment) by two separate receiver chains. This may be a straight-forward approach for DSDT. However, the two separate receiver chains might facilitate also an easier implementation of HSPA (High Speed Packet Access) extensions like dual-band HSDPA (High Speed Downlink Packet Access), 4-carrier HSDPA, or dual carrier HSUPA (High Speed Uplink Packet Access).

The problem occurs now if both, DSDT and the HSDPA extensions, shall run in parallel, and for example both request to use the two receivers.

SUMMARY

A radio communication device may be provided. The radio communication device may include: a first circuit; a second circuit; a processor configured to operate the radio communication device in a plurality of operation modes, wherein the plurality of operation modes may include: a first operation mode in which the first circuit processes received data of a first communication channel independent from the second circuit and in which the second circuit processes received data of a second communication channel independent from the first circuit; and a second operation mode in which the first circuit and the second circuit jointly process received data of a third communication channel. The radio communication device may further include a mode switching circuit configured to switch between the plurality of operation modes.

A method for controlling a radio communication device may be provided. The method may include: controlling a first circuit; controlling a second circuit; controlling operation of the radio communication device to operate in a first operation mode in which the first circuit processes received data of a first communication channel independent from the second circuit and in which the second circuit processes received data of a second communication channel independent from the first circuit; and to operate in a second operation mode in which the first circuit and the second circuit jointly process received data of a third communication channel. The method may further include switching operation of the communication device between the first and the second operation modes.

A radio communication device may be provided. The radio communication device may include: a first circuit; a second circuit; a processor configured to operate the radio communication device in a plurality of operation modes, wherein the plurality of operation modes may include: a first operation mode in which the first circuit processes received data of a first communication channel independent from the second circuit and in which the second circuit processes received data of a second communication channel independent from the first circuit; and a second operation mode in which the first circuit and the second circuit jointly process received data of a third communication channel according to a High Speed Packet Access extension. The radio communication device may further include a mode switching circuit configured to switch between the plurality of operation modes.

A method for controlling a radio communication device may be provided. The method may include: controlling a first circuit; controlling a second circuit; controlling operation of the radio communication device in a plurality of operation modes to operate in a first operation mode in which the first circuit processes received data of a first communication channel independent from the second circuit and in which the second circuit processes received data of a second communication channel independent from the first circuit; and to operate in a second operation mode in which the first circuit and the second circuit jointly process received data of a third communication channel according to a High Speed Packet Access extension. The method may further include switching operation of the radio communication device between the plurality of operation modes.

BRIEF DESCRIPTION OF THE DRAWINGS

In the drawings, like reference characters generally refer to the same parts throughout the different views. The drawings are not necessarily to scale, emphasis instead generally being placed upon illustrating the principles of various aspects of this disclosure. In the following description, various aspects of this disclosure are described with reference to the following drawings, in which:

FIG. 20 shows block diagram illustrating an embodiment of a mobile communications radio receiver;

FIG. 21 shows block diagram illustrating an embodiment of a mobile communications radio receiver;

FIG. 23 shows a timing diagram illustrating a first scenario of continuous packet connectivity on a first network and a second network;

FIG. 24 shows a timing diagram illustrating a second scenario of continuous packet connectivity on a first network and a second network;

FIG. 25 shows a timing diagram illustrating a third scenario of continuous packet connectivity on a first network and a second network;

FIG. 31 shows a radio communication device with two subscriber identity modules and a switching decision circuit;

DESCRIPTION

Figure 1:
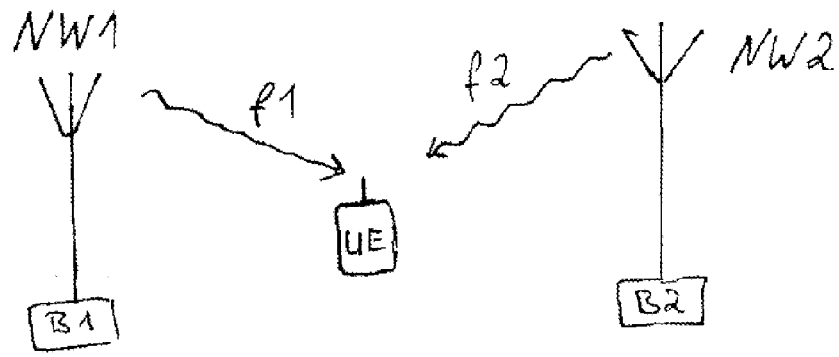
FIG. 1 shows an illustration of a first multiple network scenario for a mobile communications radio receiver.

The following detailed description refers to the accompanying drawings that show, by way of illustration, specific details and aspects of the disclosure in which the invention may be practiced. These aspects of the disclosure are described in sufficient detail to enable those skilled in the art to practice the invention. Other aspects of the disclosure may be utilized and structural, logical, and electrical changes may be made without departing from the scope of the invention. The various aspects of the disclosure are not necessarily mutually exclusive, as some aspects of the disclosure may be combined with one or more other aspects of the disclosure to form new aspects of the disclosure.

The terms "coupling" or "connection" are intended to include a direct "coupling" or direct "connection" as well as an indirect "coupling" or indirect "connection", respectively.

The word "exemplary" is used herein to mean "serving as an example, instance, or illustration". Any aspect of this disclosure or design described herein as "exemplary" is not necessarily to be construed as preferred or advantageous over other aspect of this disclosure or designs.

The term "protocol" is intended to include any piece of software, that is provided to implement part of any layer of the communication definition.

A radio communication device may be an end-user mobile device (MD). A radio communication device may be any kind of mobile radio communication device, mobile telephone, personal digital assistant, mobile computer, or any other mobile device configured for communication with a mobile communication base station (BS) or an access point (AP) and may be also referred to as a User Equipment (UE), a phone, a mobile station (MS) or an advanced mobile station (advanced MS, AMS), for example in accordance with IEEE 802.16m.

The radio communication device may include a memory which may for example be used in the processing carried out by the radio communication device. A memory may be a volatile memory, for example a DRAM (Dynamic Random Access Memory) or a non-volatile memory, for example a PROM (Programmable Read Only Memory), an EPROM (Erasable PROM), EEPROM (Electrically Erasable PROM), or a flash memory, for example, a floating gate memory, a charge trapping memory, an MRAM (Magnetoresistive Random Access Memory) or a PCRAM (Phase Change Random Access Memory).

As used herein, a "circuit" may be understood as any kind of a logic implementing entity, which may be special purpose circuitry or a processor executing software stored in a memory, firmware, or any combination thereof. Furthermore, a "circuit" may be a hard-wired logic circuit or a programmable logic circuit such as a programmable processor, for example a microprocessor (for example a Complex Instruction Set Computer (CISC) processor or a Reduced Instruction Set Computer (RISC) processor). A "circuit" may also be a processor executing software, for example any kind of computer program, for example a computer program using a virtual machine code such as for example Java. Any other kind of implementation of the respective functions which will be described in more detail below may also be understood as a "circuit". It may also be understood that any two (or more) of the described circuits may be combined into one circuit.

Description is provided for devices, and description is provided for methods. It will be understood that basic properties of the devices also hold for the methods and vice versa. Therefore, for sake of brevity, duplicate description of such properties may be omitted.

It will be understood that any property described herein for a specific device may also hold for any device described herein. It will be understood that any property described herein for a specific method may also hold for any method described herein.

A mobile communications radio for multiple network operation may be provided, like will be described below. Devices and methods may be provided for mobile communications, and more particularly for receiving and processing pagings from multiple networks.

A new feature for receivers in mobile communications is Dual-SIM-Dual-Standby (DSDS). It means the UE (user equipment) contains (at least) two SIM (subscriber identity module) cards and registers in (at least) two networks. If the UE is in an idle/standby state, it shall be able to receive pagings, i.e. notifications of incoming calls or messages, from both networks.

Another challenging feature for a Dual SIM (DS) phone is to receive a paging on one network during an active connection (e.g. call) on the other network. This feature will be referred to as Dual-SIM-Single-Transport (DSST) in the following.

A straight-forward approach to avoid missing of a paging on one network while being in a call on the other network (i.e. during a DSST scenario) is to add a second receive path to the UE. However, this means additional hardware, implying additional chip area and power consumption.

For these and other reasons there is a need for improvements in techniques for receiving and processing pagings from multiple networks.

In the following detailed description, reference is made to the accompanying drawings, which form a part thereof, and in which are shown by way of illustration specific embodiments in which the invention may be practiced. In the drawings, like reference numerals are generally utilized to refer to like elements throughout the description. In the following description, for purposes of explanation, numerous specific details are set forth in order to provide a thorough understanding of one or more aspects of embodiments of the invention. It may be evident, however, to one skilled in the art that one or more aspects of the embodiments of the invention may be practiced with a lesser degree of these specific details. In other instances, known structures and devices are shown in a simplified representation in order to facilitate describing one or more aspects of the embodiments of the invention. The following description is therefore not to be taken in a limiting sense, and the scope of the invention is defined by the appended claims.

The various aspects summarized may be embodied in various forms. The following description shows by way of illustration various combinations and configurations in which the aspects may be practiced. It is understood that the described aspects and/or embodiments are merely examples, and that other aspects and/or embodiments may be utilized and structural and functional modifications may be made without departing from the scope of the present disclosure. In particular, it is to be understood that the features of the various exemplary embodiments described herein may be combined with each other, unless specifically noted otherwise.

As employed in this specification, the terms "coupled" and/or "electrically coupled" are not meant to mean that the elements must be directly coupled together; intervening elements may be provided between the "coupled" or "electrically coupled" elements.

The mobile communications radio receiver described herein will be referred to as UE (user equipment) and may be employed in terminal devices of wireless communication systems, in particular in mobile phones or other mobile terminal devices.

By way of example, FIG. 1 illustrates a first multiple network scenario for a mobile communications radio receiver (UE). The UE is configured to register in two networks NW1 and NW2. In this embodiment, the networks NW1 and NW2 are operated on different frequency bands f1 and f2. Thus, since the UE must be available to receive pagings from the NW1 operator and the NW2 operator, the UE must be able to tune to frequency bands f1 and f2. By way of example, as shown in FIG. 1, different base stations B1, B2 (i.e. different cells) may be used by the networks NW1 and NW2. However, it is also possible that networks NW1 and NW2 use shared base stations B1=B2 (i.e. the same cells).

Figure 2:
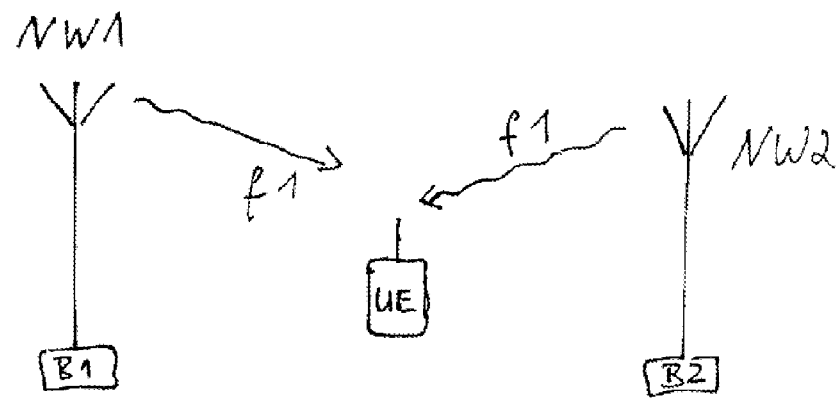
FIG. 2 shows an illustration of a second multiple network scenario for a mobile communications radio receiver.

FIG. 2 illustrates a second multiple network scenario for an UE. The UE is configured to register in two networks NW1 and NW2. In contrast to the scenario illustrated in FIG. 1, the networks NW1 and NW2 are operated on the same frequency band f1. Thus, the UE is available to receive pagings from the NW1 operator and the NW2 operator if tuned to frequency band f1. By way of example, as shown in FIG. 2, different base stations B1, B2 (i.e. different cells) may be used by the networks NW1 and NW2. However, it is also possible that networks NW1 and NW2 use shared base stations B1=B2 (i.e. the same cells).

Throughout this description, the signals received from the first and second networks NW1, NW2 are different, i.e. they contain different information.

Figure 3:
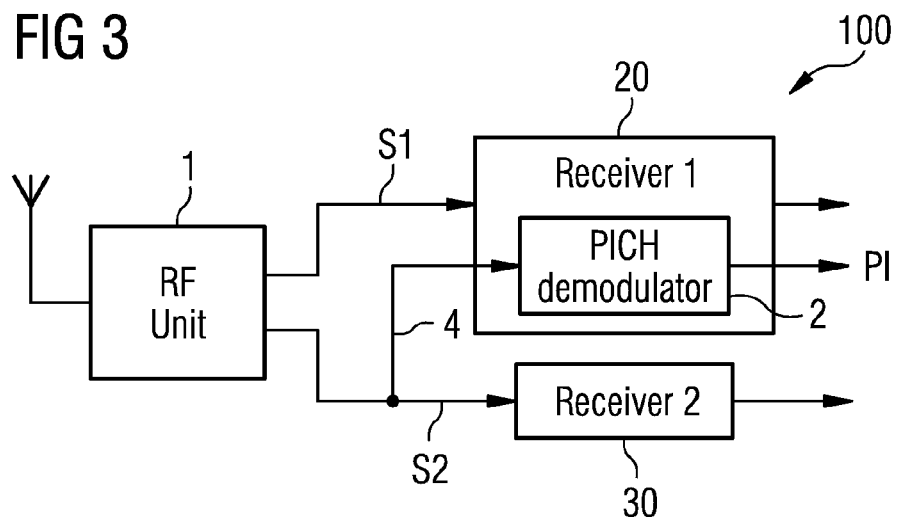
FIG. 3 shows a block diagram illustrating an embodiment of a mobile communications radio receiver.

FIG. 3 is a block diagram illustrating an embodiment of an UE 100. UE 100 comprises an RF unit 1, a first receiver 20 for demodulating a first down-converted signal S1 from a radio signal received from the first radio network NW1 and a second receiver 30 for demodulating a second down-converted signal S2 from a radio signal received from the second radio network NW2. The first receiver 20 comprises, inter alia, a paging indicator channel demodulator 2 which may be operated to demodulate a paging indicator channel (PICH) of the first radio network NW1 based on the first down-converted signal S1.

In this embodiment, the PICH demodulator 2 of the first receiver 20 is connected by a data connection 4 to signal S2 which contains the paging indicator channel signal of the second network NW2. This allows for resource sharing between the first and second receivers 20, 30. More specifically, during DSST, when there is an active connection established on network NW1, i.e. the first receiver 20 is active to demodulate e.g. speech data of a call on network NW1, the PICH resource of the first receiver 20 would be unused. In this situation, the signal which contains the paging indicator (PI) of the second network NW2 is routed via data connection 4 to the PICH demodulator 2 of the first receiver 20. Thus, a paging on the second network NW2 may be detected in the first receiver 20. Note that the second receiver 30 may be a reduced receiver such as, e.g., implemented in a Dual-Cell/Dual-Band HSUPA (High Speed Uplink Packet Access) receiver, which has no PICH demodulator.

Figure 4:
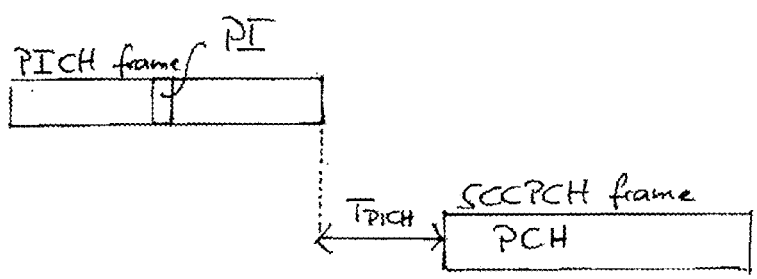
FIG. 4 shows a diagram illustrating by way of example a possible structure of a paging indicator channel and a control channel associated therewith.

FIG. 4 is diagram illustrating by way of example a possible structure of a PICH and a control channel associated with the PICH and referred to as SCCPCH (Secondary Common Control Physical Channel). PICH and SCCPCH are used for pagings in general WCDMA systems.

The PICH is repeatedly transmitted over radio frames having a length of, e.g., 10 ms, i.e. the length of UMTS (Universal Mobile Telecommunications System) radio frames. The PICH is used to carry the PI. The PICH is always associated with an SCCPCH to which a PCH (Paging CHannel) is mapped. A PI set in a PICH frame means that a paging message is to be transmitted on the PCH in the SCCPCH frame. There is a time difference of $T_{PICH}$ between the PICH frame and the SCCPCH frame associated with the PICH frame. In other words, the SCCPCH frame is transmitted $T_{PICH}$ after the end of the PICH frame. The time gap $T_{PICH}$ between the PICH and SCCPCH frames may be between 2 ms (3 slots) and 20 ms (30 slots).

Figure 5:
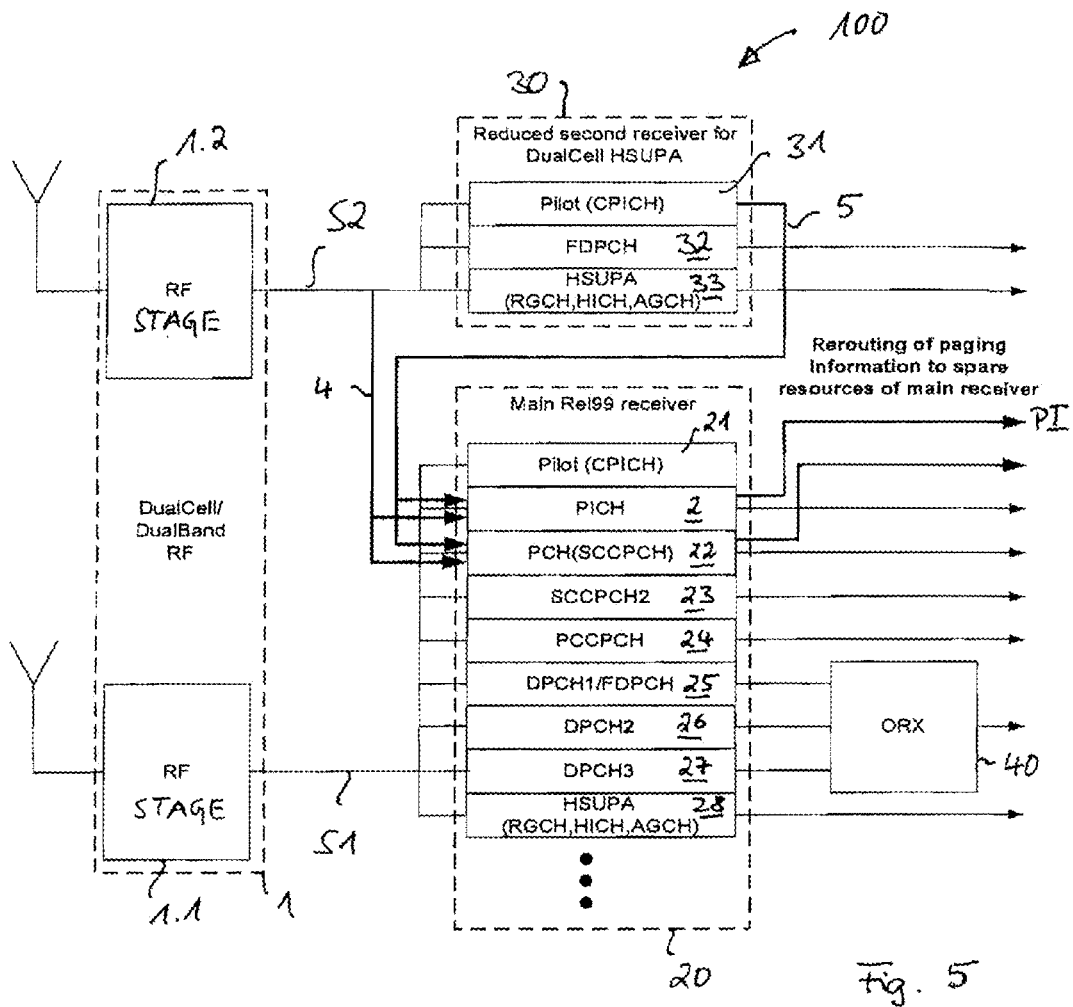
FIG. 5 shows a block diagram illustrating an embodiment of a mobile communications radio receiver.

FIG. 5 illustrates a block diagram of one embodiment of UE 100. By way of example, the RF unit 1 may comprise two RF stages 1.1 and 1.2. The RF stages 1.1 and 1.2 may be tuned to different frequency bands. RF stage 1.1 comprises an RF down-converter and provides the first down-converted signal S1 from a radio signal received from network NW1 and RF stage 1.2 comprises an RF down-converter and provides the second down-converted signal S2 from a radio signal received from network NW2. Thus, different down-conversion frequencies may be concurrently used in the RF stages 1.1 and 1.2, respectively. The RF unit 1 may in particular be used in a dual cell/dual band environment using different frequency bands for transmissions of networks NW1 and NW2 as shown in FIG. 1.

FIG. 5 further illustrates a block diagram of the first and second receivers 20 and 30 contained in UE 100, respectively. As mentioned earlier in conjunction with FIG. 3, the UE 100 may contain a first or main receiver 20 and a second or reduced receiver 30. The main receiver 20, which may be an UMTS Re199 receiver, may comprise a number of demodulators, e.g. a CPICH (Common PIlot CHannel) demodulator 21 for pilot demodulation, a PCH(SCCPCH) demodulator 22 for PCH demodulation in case a PI is detected by the PICH demodulator 2, a second SCCPCH demodulator 23, a PCCPCH (Primary Common Control Physical CHannel) demodulator 24, a DPCH1/FDPCH (Dedicated Physical CHannel/Fractional Dedicated Physical CHannel) demodulator 25, two additional DPCH demodulators 26, 27 and a HSUPA (High Speed Uplink Packet Access) demodulator 28 for demodulating the corresponding RGCH (Relative Grant CHannel), HICH (Hybrid ARQ Indicator CHannel) and AGCH (Absolute Grant CHannel).

The reduced receiver 30 may contain a number of demodulators which are needed for Dual-Carrier HSUPA capability, namely a CPICH demodulator 31 for pilot demodulation, a FDPCH demodulator 32 and a HSUPA demodulator 33 for demodulating the corresponding RGCH, HICH and AGCH.

It is to be noted that in HSUPA uplink data is transmitted on two different carriers. Thus, to receive the corresponding (different) HSUPA control channels, an UE having HSUPA capability needs a second receiver. To limit semiconductor chip area and power consumption, the second receiver may be stripped down to the functions necessary for the demodulation of the HSUPA control channel on the second carrier. The reduced receiver 30 shown in FIG. 5 is such a second receiver configured for HSUPA control channel demodulation. Note that this reduced receiver 30 may not contain any DPCH demodulator, since on the second carrier no Re199 data downlink channel DPCH exists. Further, the reduced receiver 30 does not contain any PICH and/or PCH(SCCPCH) demodulators for the receipt of pagings. This may also apply to the UE 100 illustrated in FIG. 3.

Further, the UE 100 in one embodiment may contain only one single main receiver 20 employing, e.g., demodulators 21 to 28 and only one single reduced receiver 30 employing, e.g., demodulators 31 to 33.

Similar to the illustration in FIG. 3, a data connection 4 is used to route signal S2, which contains the PICH and the SCCPCH on the second network NW2, to the main receiver 20, and, more specifically, e.g. to the inputs of the PICH demodulator 2 and the PCH(SCCPCH) demodulator 22. Again, since the main receiver 20 is operating a call on the first network NW1 (i.e. the DSST scenario is considered), the paging resources in the main receiver 20 are unused. More specifically, while the DPCH1/FDPCH demodulator 25 and the DPCH2 and DPCH3 demodulators 26, 27 in the main receiver 20 are used to demodulate the downlink speech data from network NW1, the PICH demodulator 2 and the PCH (SCCPCH) demodulator 22 are configured to demodulate in parallel to the DPCH1/FDPCH demodulator 25 and the DPCH2 and DPCH3 demodulators 26, 27 (i.e. parallel to an active call) the PICH and PCH(SCCPCH) frames on network NW2.

The second or reduced receiver 30 may comprise a channel estimator to generate channel estimates based on the second down-converted signal S2. Here, by way of example, the CPICH demodulator 31 may be used as a channel estimator. Thus, at an output of the CPICH demodulator 31, channel estimates indicative of the communication link over the second network NW2 are provided. These channel estimates are routed via data connection 5 to the first main receiver 20.

The channel estimates generated in the reduced receiver 30 and provided via data connection 5 may be input to the PICH demodulator 2 and the PCH(SCCPCH) demodulator 22 of the main receiver 20 in order to demodulate the PI and the SCCPCH on the second carrier (second network NW2). This is possible since these resources are unused during DSST in UE 100. When rerouting the paging information of the second network NW2 to the unused PICH and PCH(SCCPCH) demodulators 2, 22 in the main receiver 20, the outputs of these demodulators 2, 22 have to be interpreted by downstream paging decoder circuitry (not shown) to be indicative of pagings on the second network NW2 rather than pagings on the first network NW1.

As known in the art, the receivers 20, 30 are also referred to as inner receivers (IRX) and may, for instance, be implemented by a RAKE receiver. The outputs of the various demodulators 2, 21 to 28 and 31 to 33 are indicated by arrows and may be coupled to individual decoders. In FIG. 5, by way of example and for the sake of illustrative ease, only a channel decoder 40 for decoding the outputs of the DPCH1/FDPCH demodulator 25 and the DPCH2 and DPCH3 demodulators 26, 27 is shown. Such channel decoder 40 is also referred to as outer receiver (ORX) in the art. It is to be noted that the UE 100 may comprise a number of channel decoders (not shown) with each channel decoder being configured to decode a specific channel signal received from one channel demodulator 2, 21 to 28 of the main receiver 20 and from one channel demodulator 31 to 33 of the reduced receiver 30.

Figure 6:
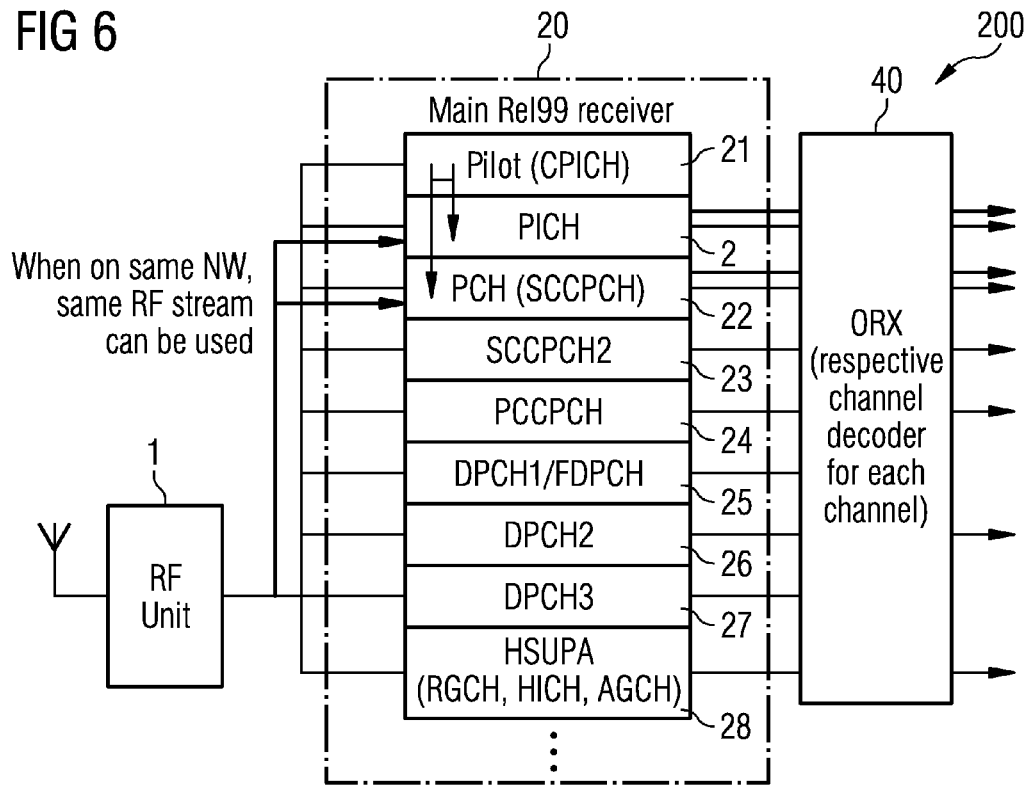
FIG. 6 shows a block diagram illustrating an embodiment of a mobile communications radio receiver.

FIG. 6 illustrates a block diagram of one embodiment of UE 200. The UE 200 may comprise only one single RF unit 1, which can only be tuned to one frequency band. The RF unit 1 provides a down-converted signal which comprises signal S1 received from network NW1 and signal S2 received from network NW2. Thus, the same down-conversion frequency is used to generate signals S1 and S2. The UE 200 may in particular be used in a dual cell/single band environment using the same frequency band for transmissions of networks NW1 and NW2 as shown in FIG. 2.

Further, the UE 200 may in particular be used in a dual cell/single band environment operating in only one network NW1. In this case, two subscribers corresponding to the two SIM cards may use the UE 200 concurrently.

The UE 200 may comprise only a single receiver 20. Similar to the operation already explained with respect to FIGS. 3 and 5, during an active connection (e.g. call) on one SIM, the DPCH1/FDPCH demodulator 25 and the DPCH2 and DPCH3 demodulators 26, 27 in the receiver 20 are used to demodulate the downlink speech data for one SIM. During this activity, the PICH demodulator 2 and the PCH(SCCPCH) demodulator 22 are configured to demodulate in parallel to the DPCH1/FDPCH demodulator 25 and the DPCH2 and DPCH3 demodulators 26, 27 (i.e. parallel to an active call) any pagings received on PICH and SCCPCH for the other SIM (i.e. the other subscriber). Since on the same network the CPICH is valid for both subscribers, a second (reduced) receiver 30 is not needed. In FIG. 6, the vertical arrows indicate channel estimates generated in the CPICH demodulator 21 to be used for demodulating pagings in the PICH demodulator 2 and the PCH(SCCPCH) demodulator 22.

Figure 7:
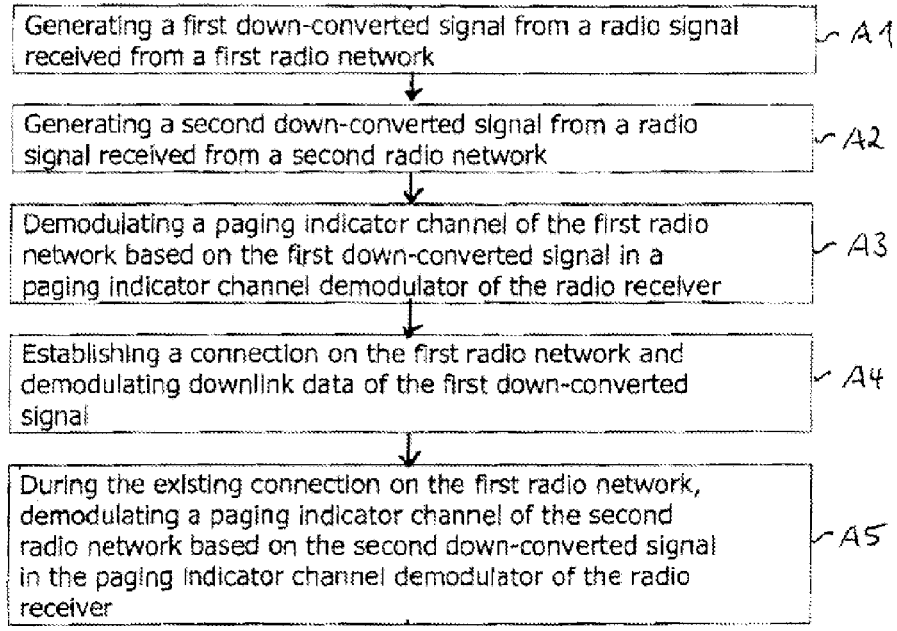
FIG. 7 shows a flowchart of an embodiment of a method of listening to pagings transmitted by a second network while having a connection established with a first network.

FIG. 7 is a flowchart of an embodiment of a method of listening to pagings transmitted by the second network NW2. This method may be performed by UE 100 or 200 as shown in FIGS. 3, 5 and 6.

As already described above, a first down-converted signal S1 from a radio signal received from a first radio network NW1 and a second down-converted signal S2 from a radio signal received from a second radio network NW2 are generated at A1 and A2, respectively. For instance, as shown in FIG. 5, RF stages 1.1 and 1.2 may be used to generate S1 and S2, respectively.

When there is no active data connection established with the first network NW1, the paging indicator channel of the first network NW1 based on the first down-converted signal S1 is demodulated in the PICH demodulator 2 of the main radio receiver 20 at A3. Further, the PCH(SCCPCH) demodulator 22 is used to demodulate the corresponding control channel SCCPCH of the first network NW1.

When the first network NW1 is signaling via PICH and SCCPCH that a connection is to be established, the DPCH1/FDPCH demodulator 25 and the DPCH2 and DPCH3 demodulators 26, 27 are activated to demodulate downlink message data such as e.g. speech data. Thus, a connection on the first radio network NW1 is established at A4. Then, while having an existing connection established on the first radio network NW1, a PICH and a SCCPCH of the second radio network NW2 based on the second down-converted signal is demodulated at A5 in the same PICH demodulator 2 and the same PCH(SCCPCH) demodulator 22 as has been used before to demodulate the corresponding PICH and SCCPCH of the first network NW1. This is accomplished by replacing the signal S1 by the signal S2 at the inputs of the PICH demodulator 2 and the PCH(SCCPCH) demodulator 22, i.e. by rerouting the signal S2 to the main receiver 20.

Figure 8:
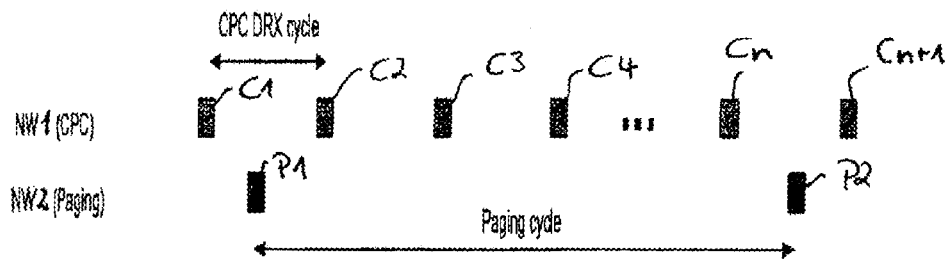
FIG. 8 shows a timing diagram illustrating a first scenario of continuous packet connectivity on a first network and paging on a second network.
Figure 9:
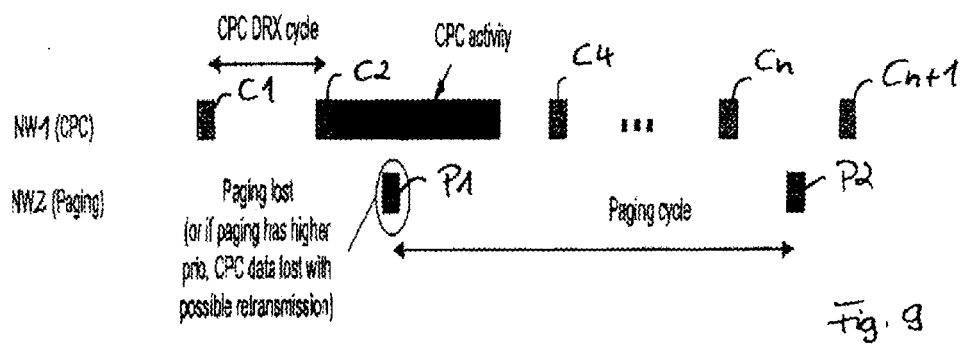
FIG. 9 shows a timing diagram illustrating a second scenario of continuous packet connectivity on a first network and paging on a second network.
Figure 10:
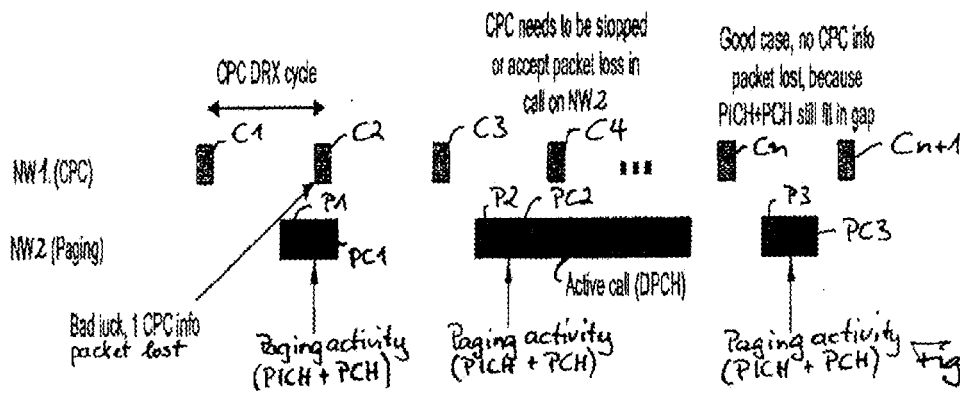
FIG. 10 shows a timing diagram illustrating a third scenario of continuous packet connectivity on a first network and paging on a second network.

According to another aspect, discontinuous reception (DRX) cycles of continuous packet connectivity (CPC) on the first network NW1 are used to receive pagings from the second network NW2. FIGS. 8 to 10 are timing diagrams illustrating various scenarios of CPC on the first network NW1 and paging on the second network NW2.

With CPC an UE can have an active connection to the first network NW1, but if no data is sent the UE only checks in certain intervals if data is available. In between these checks the UE can be turned off to save power. The intervals between the checks are referred to as CPC DRX cycles.

FIG. 8 illustrates the timing of a CPC connection between the first network NW1 and an UE. The time spans during which the UE checks whether data is available on the first network NW1 are indicated by C1, C2, C3, . . . , Cn, Cn+1.

Since the demodulator of the UE is turned off during the CPC DRX cycles between C1, C2, C3, . . . , Cn, Cn+1, it can be turned on during these periods in order to listen to pagings on the second network NW2. In one embodiment, if the second network NW2 is operated on a different frequency band f2 than the frequency band f1 used by the first network NW1, see FIG. 1, the UE has to be tuned to the second frequency band f2 upon activation during the CPC DRX cycles. In another embodiment, if the first and second networks NW1 and NW2 operate on the same frequency band f1, see FIG. 2, the UE must not be tuned to another frequency band when activated during the CPC DRX cycles of the first network NW1 to listen to pagings on the second network NW2.

FIG. 8 illustrates the case where there is a CPC connection but no activity (beyond the CPC DRX cycles) on the first network NW1 and there are no pagings on the second network NW2. The paging instances on the second network NW2, i.e. the times when the PI in the PICH frames may occur, are indicated by P1, P2, . . . . Here, the paging instances of the second network NW2 fit into the CPC DRX cycles of the first network NW1 (which operates on an existing but idle CPC connection with the UE). Therefore, the occurrence of a PI at a paging instance in the second network NW2 would be detectable. Note that the paging cycle on the second network NW2 is defined by the time interval between consecutive paging instances P1, P2, . . . . The duration of the paging cycle may be e.g. between 80 and 5120 ms.

It is to be noted that the paging cycle may be considerably longer than the CPC DRX cycle. Thus, as illustrated in FIG. 8, it may not be necessary to re-activate the UE during each CPC DRX cycle in order to listen to pagings on the second network NW2. Rather, since the length of the paging cycle of network NW2 is known in the UE, it may be sufficient to activate the UE only during specific CPC DRX cycles, e.g. during the cycle between C1 and C2 and the cycle between Cn and Cn+1, see FIG. 8.

If the paging instances P1, P2 of the second network NW2 overlap with short activities on the first network NW1 within a CPC DRX cycle to check for data, at least in the scenario of FIG. 1 (different frequency bands f1, f2), an UE having one RF unit 1 can not listen anymore to pagings P1, P2 on the second network NW2. This situation is illustrated in FIG. 9. FIG. 9 illustrates CPC activity on the first network NW1 concurrently with the timing of the paging instance P1 on the second network NW2.

In this case there are two options: The first option is that paging P1 is lost because of the ongoing CPC activity on the first network NW1. Since pagings are typically repeated several times (e.g., a paging at paging instance P1 is repeated after a delay of one paging cycle at paging instance P2), there is a high probability to receive at least one of the repetitions. For instance, as illustrated in FIG. 9, the repetition of paging P1 at paging instance P2 would be received because there is no simultaneous CPC activity in the CPC DRX cycle between Cn and Cn+1. The user probably would not notice the short delay.

The second option is to prioritize the listening to pagings on the second network NW2 over the short DRX CPC activities on the first network NW1. In this case the paging P1 would be received, whereas the CPC activity on the first network NW1 would be missed. However, missing one activity instance in CPC would not drop the CPC DRX connection on the first network NW1. It probably means only a short delay in the start of a possible data transfer on the first network NW1.

Thus, depending on the priority settings, either CPC activity on the first network NW1 or listening to pagings on the second network NW2 may be prioritized, and in both cases both operations could be performed (even though the non-prioritized operation may be delayed for a specific time such as one or more CPC DRX cycles or one or more paging cycles, respectively). The priority setting (DRX CPC or paging prioritized) may be adapted on the basis of the settings of the two networks NW1, NW2. By way of example, the priority setting may depend on the length of the paging cycle, the number of repetitions of pagings and/or the length of the CPC DRX cycle.

FIG. 10 illustrates a case of paging on the second network NW2 and no activity (beyond the CPC DRX cycles) on the first network NW1. Here, the PICH frame is assumed to contain a paging indicator (PI) at the paging instance P1. Therefore, as explained in conjunction with FIG. 4, the PCH is to be demodulated in the associated SCCPCH frame. In FIG. 10 the PCH is indicated by reference signs PC1, PC2, PC3.

By way of example, C2 may occur concurrently with PC1. In this case one CPC info packet, namely the packet which would be received during C2, is lost if paging on the second network NW2 is prioritized over the CPC DRX connection on the first network NW1. This is illustrated in the left side portion of FIG. 10.

On detecting a paging on the second network NW2, an active call on the second network NW2 may be set up. In this case there are two options: The first option is to stop the CPC DRX connection on the first network NW1. In this case the CPC DRX connection is terminated. Another option is to maintain the CPC DRX connection on the first network NW1 and to accept packet loss in the call on the second network NW2. Since lost packets can also occur in an uninterrupted connection, the user would not notice the packet loss on the second network NW2 due to the continuation of the CPC DRX connection on the first network NW1. This situation of conflicting CPC DRX connection on the first network NW1 and an active call on the second network NW1 is depicted in the middle portion if FIG. 10 with reference to C3, C4 and P2, PC2, respectively.

As further shown in FIG. 10, it is also possible that the paging instance P3 (PICH frame) and the corresponding PCH (referred to as PC3) on the SCCPCH frame fit into the CPC DRX cycle gap. In this case, each paging (PICH and PCH) can be received on the second network NW2, and no CPC DRX info packet is lost during demodulation of the pagings.

In one embodiment, not shown in FIG. 10, there is an active continuous data transfer connection on the first network NW1. In this case it would typically not be possible to listen anymore to the paging on the second network NW2, because there are no CPC DRX cycles any more. However, even in this case, depending on the setting of the number of repetitions of data packets on the first network NW1 if a data packet is lost, it might even be possible to shortly interrupt the data transfer on the first network NW1 through higher layers (TCP/IP . . . ) and listing instead to possible pagings on the second network NW2. Listening to a paging indicator (PI) on the second network NW2 requires only a few slots (see FIG. 4) and much less than an UMTS frame. Therefore, even in this case of a continuous data connection on the first network NW1, it might be possible to shortly listen to the second network NW2 during the PI instances P1, P2, . . . because the lost data packets on the first network NW1 will probably be repeated. Thus, the user would not notice the loss of packets on the first network NW1 connection. Even for a long ongoing data transfer on the first network NW1, the packet dropping due to listening for pagings on the second network NW2 will only result in a slightly lower throughput on the first network NW1, which will not be noticed by the user.

Figure 11:
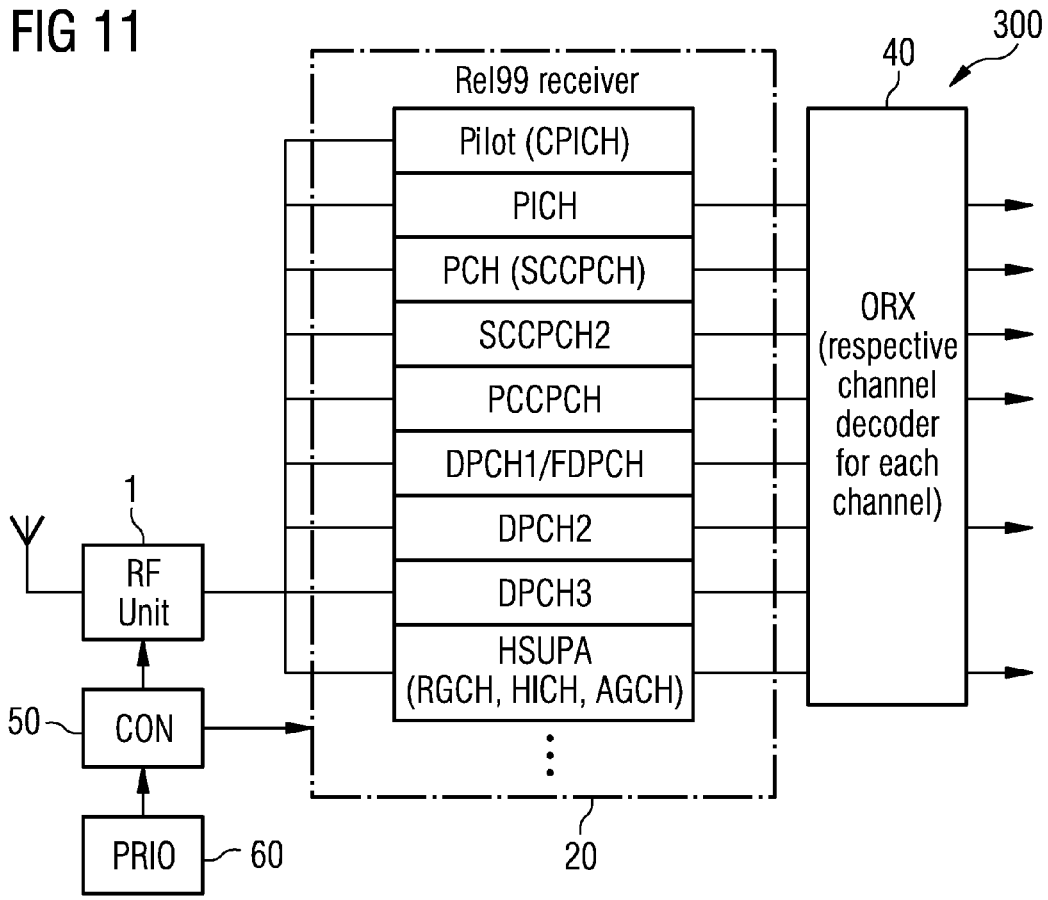
FIG. 11 shows a block diagram illustrating an embodiment of a mobile communications radio receiver.

FIG. 11 illustrates an embodiment of an UE 300 configured to be operated using one or more of the methods described above with reference to FIGS. 8 to 10. This UE 300 may comprise one single receiver 20 which may be similar to the main receiver 20 shown in FIG. 5. More specifically, the receiver 20, which may be a UMTS Re199 receiver, may comprise a CPICH demodulator 21 for pilot demodulation, a PCH(SCCPCH) demodulator 22 for PCH demodulation, a second SCCPCH demodulator 23, a PCCPCH demodulator 24, a DPCH1/FDPCH demodulator 25, two additional DPCH demodulators 26, 27 and a HSUPA demodulator 28. The outputs of the various demodulators 2, 21 to 28 are provided to a channel decoder 40 (ORX). The channel decoder 40 may contain for each channel a respective channel decoder to decode the specific channel signal received from one channel demodulator 2, 21 to 28 of the receiver 20.

The UE 300 may comprise a single-band RF unit 1, which can be tuned to the frequency bands f1 and f2 in a sequential manner, but which can not down-convert the frequency bands f1 and f2 concurrently. The single-band RF unit 1 may be controlled by a control unit 50. The control unit 50 is configured to switch the single-band RF unit 1 to either generate the first down-converted signal S1 from the first network NW1 or to generate the second down-converted signal S2 from the second network NW2. The main receiver 20 is informed by the control unit 50 on this selection. A priority setting in case of conflicting CPC DRX activity on network NW1 and paging on network NW2 may be selected by a priority selection unit 60 in accordance with the description above.

Figure 12:
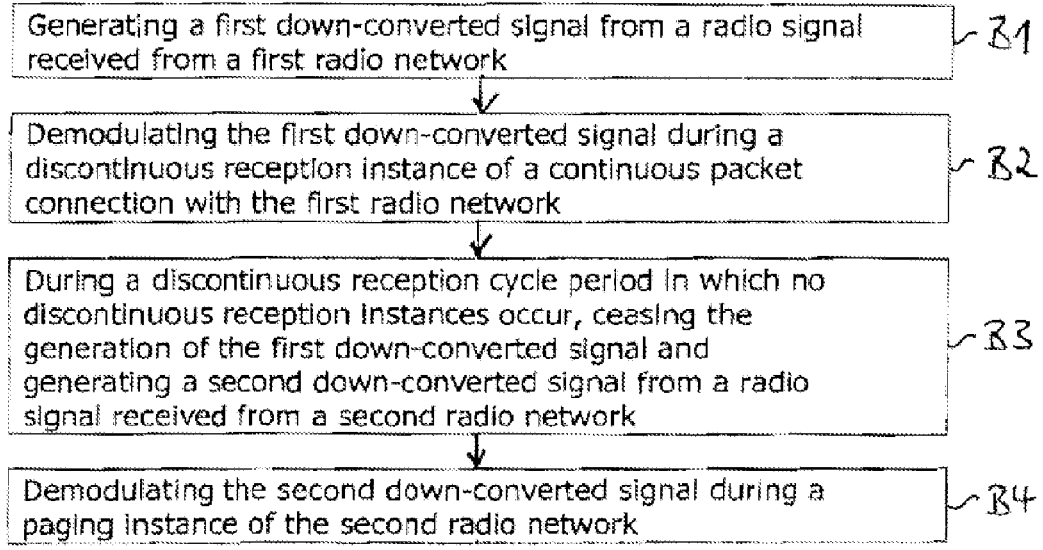
FIG. 12 shows a flowchart of an embodiment of a method of listening to pagings transmitted by a second network while having a DRX continuous packet connection established with a first network.

According to FIG. 12, the UE 300 may operate as follows: A first down-converted signal S1 from a radio signal received from a first network NW1 is generated at B1. This first down-converted signal S1 is demodulated during a discontinuous reception instance of a CPC DRX connection with the first radio network NW1 at B2. During a DRX cycle period in which no DRX instances occur, the generation of the first down-converted signal S1 is stopped and the second down-converted signal S2 from a radio signal received from the second network NW2 is generated at B3. The second down-converted signal S2 is demodulated during a paging instance on the second network NW2 at B4. The control of the RF unit 1 and the receiver 20 in accordance with the above description is accomplished by the control unit 50.

Figure 13:
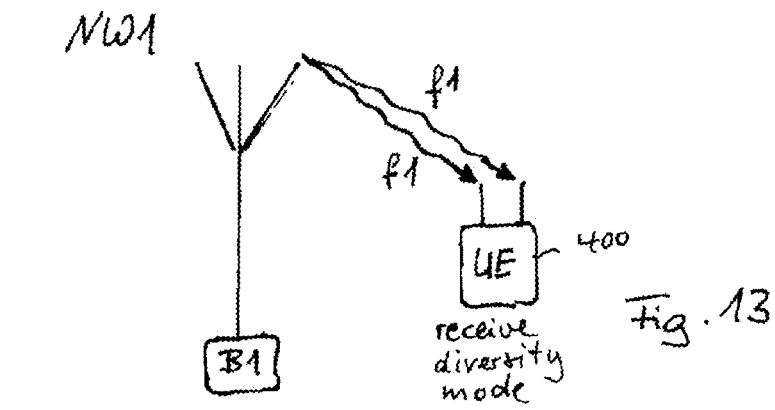
FIG. 13 shows an illustration of a receive diversity mobile communications radio receiver receiving a signal from a first network.
Figure 14:
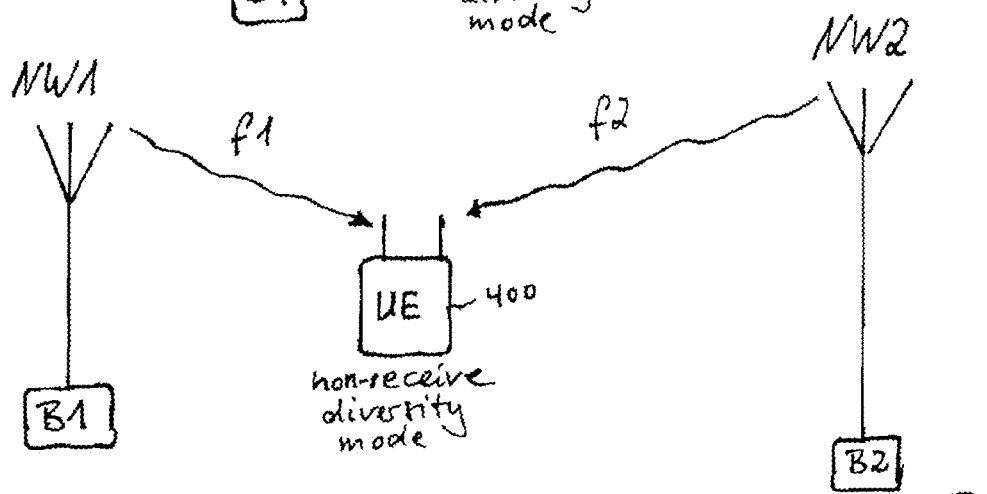
FIG. 14 shows an illustration of a receive diversity mobile communications radio receiver operating in a single receiver mode on the first network and in a paging mode on a second network.

According to another aspect, receive diversity operation of an UE 400 on the first network NW1 may be exploited to receive pagings from the second network NW2. FIGS. 13 and 14 are explanatory illustrations of this concept.

FIG. 13 illustrates an UE 400 operating in a receive diversity mode on a single network NW1. In case of a receive diversity connection the UE 400 has (at least) two antennas for receiving a first and a second radio signal from the first network NW1. As each antenna is coupled to a separate receiver chain in the UE 400, a receive diversity connection occupies two receiver chains in UE 400. In other words, the two receiver chains are tuned to the same frequency f1 and demodulate signals from two different antennas containing the same information. The signals, however, are different because they arrive at the UE 400 via different propagation paths.

In order to receive pagings from the second network NW2, the UE 400 may be configured to switch the receive diversity operation (FIG. 13) on the first network NW1 to a single receiver chain reception for the duration of the paging occurrence on the second network NW2. This releases the second receiver chain, which may then be used to demodulate a paging indicator channel of the second network NW2. This is shown by way of example in FIG. 14. Here the receive diversity operation on the first network NW1 is interrupted and the connection on the first network NW1 is continued in a single receive antenna mode, in which only one receiver chain is needed to demodulate the radio signal (e.g. speech signal) transmitted by the first network NW1. Concurrently, the second receiver chain is tuned to frequency f2 of the second network NW2. The second receive antenna and the receiver chain associated with the second antenna are then used to receive and demodulate pagings on the second network NW2.

As explained above with reference to other embodiments, the switching from receive diversity operation to single antenna operation and back to receive diversity operation requires only a few slots, because the timing of the PI on the PICH of the second network NW2 is known in the UE 400. Therefore, although the receiver capability and the demodulation performance on the first network NW1 are reduced for a short period of time, the user may probably not notice this degradation. On the other hand, he may securely receive pagings on the second network NW2.

Figure 15:
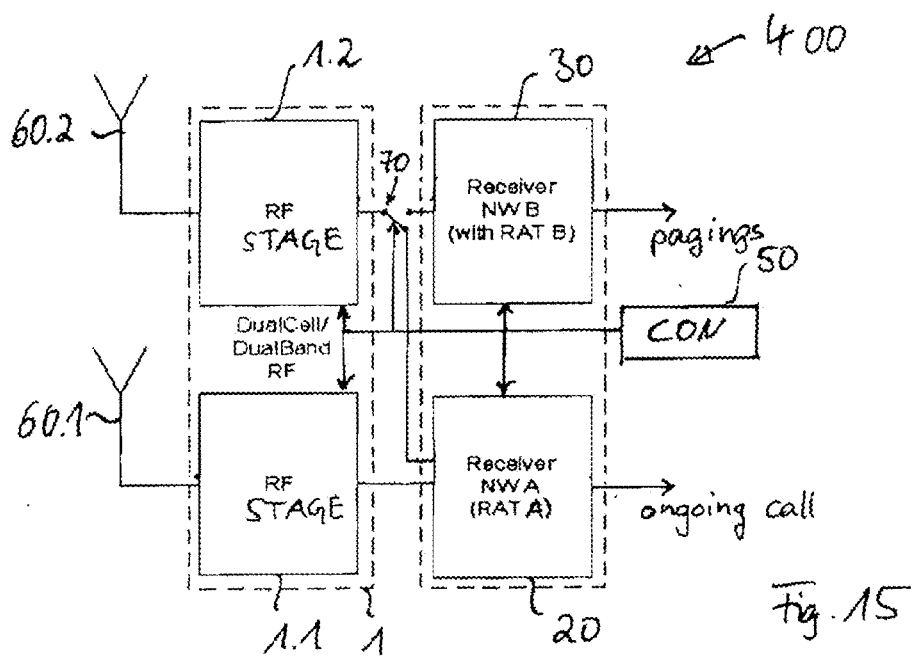
FIG. 15 shows a block diagram illustrating an embodiment of a receive diversity mobile communications radio receiver.

FIG. 15 is a block diagram of an embodiment of an UE 400 configured to operate in accordance with the description of FIGS. 13 and 14. The UE 400 may comprise two antennas 60.1 and 60.2. The first antenna 60.1 is coupled to an input of a first RF stage 1.1 of an RF unit 1, and the second antenna 60.2 is coupled to an input of a second RF stage 1.2 thereof. The UE 400 further comprises two receiver units 20, 30. Further, the UE 400 may comprise a switch 70 with an input thereof being coupled to an output of the second RF stage 1.2. A first output of switch 70 may be coupled to an input of the first receiver unit 20 and a second output of the switch may be coupled to an input of the second receiver unit 30. The first receiver unit 20 is configured to demodulate and decode two antenna signals during receive diversity operation. The first and second RF stages 1.1, 1.2, the first and second receiver units 20, 30 and the switch 70 are controlled by a control unit 50.

During receive diversity operation on the first network NW1 (see FIG. 13), the switch 70 is controlled by the control unit 50 to couple the output of the second RF stage 1.2 to an input of the first receiver unit 20. Thus, during e.g. an ongoing call on the first network NW1, both antenna signals S1 and S2 are demodulated in the first receiver unit 20. At paging instance P1, i.e. the time where a PI may occur on the PICH of the second network NW2, the control unit 50 tunes the second RF stage 1.2 to frequency f2 and operates the switch 70 to couple the output of the second RF stage 1.2 to an input of the second receiver unit 30. Further, the control unit 50 controls the second receiver unit 30 to demodulate and decode the PICH and, if a PI is detected on PICH, the corresponding SCCPCH frame on the second network NW2. Thus, the first down-converted signal S1 associated with the first antenna 60.1 and containing information of e.g. the ongoing call (or another data connection) on the first network NW1 is demodulated in a non-receive diversity mode in the first receiver unit 20, and the second down-converted signal S2 associated with the second antenna 60.2 and now containing the PICH of the second network NW2 is concurrently demodulated by the second receiver unit 30. If no PI is detected at the paging instance, the control unit 50 controls the RF stage 1.2, the switch 70 and the first receiver unit 20 to re-tune to the frequency band f1, to route the output of the second RF stage 1.2 to the first receiver unit 20 and to re-demodulate the downlink channel on the first network NW1 in the receive diversity mode, respectively. In other words, the second receiver chain (RF stage 1.2 and second receiver unit 30) is released and normal receive diversity operation as shown in FIG. 13 is resumed.

Thus, the control unit 50 may be configured to control the first and second RF stages 1.1, 1.2 to generate the first down-converted signal S1 from the radio signal received at the first antenna 60.1 by using a first down-conversion frequency and to generate the second down-converted signal S2 from the radio signal received at the second antenna 60.2 by using a second down-conversion frequency. In the receive diversity mode, the first and second down-conversion frequencies are equal. In the non-receive diversity mode, the first and second down-conversion frequencies are different.

Figure 16:
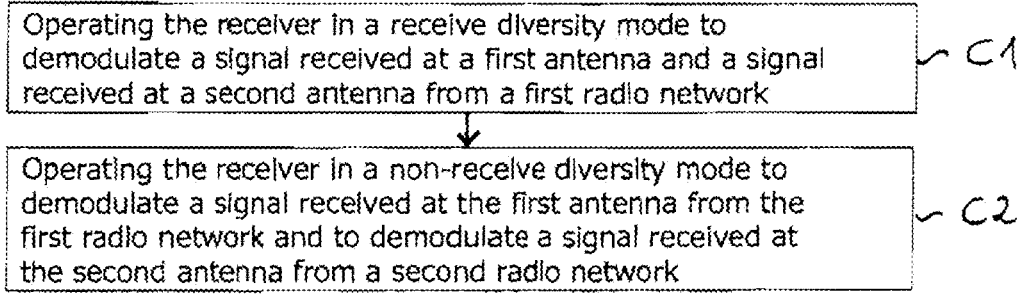
FIG. 16 shows a flowchart of an embodiment of a method of listening to pagings transmitted on a second network while operating in a single receiver mode on the first network.

According to FIG. 16, the UE 400 may operate as follows: First, at C1, the UE 400 may be operated in a receive diversity mode to demodulate a signal received at the first antenna 60.1 and a signal received at the second antenna 60.2. Both signals are from the first radio network NW1 and contain the same information, e.g. speech information. Then, at C2, the UE 400 may be operated in a non-receive diversity mode to still demodulate the signal received at the first antenna 60.1 from the first network NW1 and to demodulate a signal received at the second antenna 60.2 from the second network NW2. This signal received at the second antenna 60.2 from the second network NW2 contains different information than the signal received at the first antenna 60.1 from the first network NW1. When operated in the non-receive diversity mode, the second receiver unit 30 may demodulate a paging indicator channel of the second network NW2 from the signal received at the second antenna 60.2.

It is to be noted that the reception of speech or data and parallel paging reading as described above in all embodiments can be done in any RAT (Radio Access Technology) receivers. By way of example, in case of a 3G and 2G connection, each receiver chain may receive separately the corresponding 2G and 3G paging information. Thus, the first network NW1 and/or the second network NW2 may each be a 2G network, a 3G network or e.g. a LTE network, and any combinations of such different networks are feasible.

The methods, aspects and embodiments described herein all relate to DSST scenarios, where one connection to a subscriber (e.g. of a first network NW1) is established while listening to pagings for another subscriber (e.g. of a second network NW2). Further, also a combination and interaction with other types of Dual-SIM capabilities, for instance DSDS (Dual-SIM-Dual-Standby), where both receiver chains are in a standby mode (i.e. with no active connection on any one of the networks NW1, NW2), or DSDT (Dual-SIM-Dual-Transport), where both receiver chains process an active connection to a first and second network NW1 and NW2, respectively, are possible. Further, the methods, aspects and embodiments described herein can be extended to three or more networks and/or they can be combined.

Further, it is to be noted that in all aspects and embodiments described herein, the UEs 100 to 400 may be configured for using HSDPH and HSUPA.

A mobile communications radio receiver for multiple radio network operation may include: an RF unit configured to generate a first down-converted signal from a radio signal received from a first radio network and a second down-converted signal from a radio signal received from a second radio network; a first receiving unit comprising a paging indicator channel demodulator configured to demodulate a paging indicator channel of the first radio network based on the first down-converted signal; a second receiving unit comprising a pilot channel demodulator configured to demodulate a pilot channel of the second radio network based on the second down-converted signal; and a first data connection configured to couple paging information contained in the second down-converted signal to an input of the paging indicator channel demodulator of the first receiving unit.

The mobile communications radio receiver may further include: a channel estimator configured to generate channel estimates based on the second down-converted signal; and a second data connection configured to couple the channel estimates to an input of the first receiving unit.

The channel estimator may include the pilot channel demodulator contained in the second receiving unit.

The second data connection may be configured to couple the channel estimates to an input of the paging indicator channel demodulator of the first receiving unit.

The RF unit may include: a first RF down-converter for generating the first down-converted signal; and a second RF down-converter for generating the second down-converted signal.

The mobile communications radio receiver may be an HSUPA receiver.

A method of demodulating pagings in a mobile communications radio receiver may include: generating a first down-converted signal from a radio signal received from a first radio network; generating a second down-converted signal from a radio signal received from a second radio network; demodulating a paging indicator channel of the first radio network based on the first down-converted signal in a paging indicator channel demodulator of a radio receiver; establishing a connection on the first radio network and demodulating downlink data of the first down-converted signal; and during the existing connection on the first radio network, demodulating a paging indicator channel of the second radio network based on the second down-converted signal in the paging indicator channel demodulator of the radio receiver.

The method may further include: generating channel estimates based on the second down-converted signal; and coupling the channel estimates to an input of the paging indicator channel demodulator when demodulating the paging indicator channel of the second radio network based on the second down-converted signal.

The first down-converted signal may be generated from the radio signal received from the first radio network by using a first down-conversion frequency, the second down-converted signal may be generated from the radio signal received from the second radio network by using a second down-conversion frequency, and the first and second down-conversion frequencies may be different.

A mobile communications radio receiver for multiple radio network operation may include: an RF unit configured to generate a first down-converted signal from a radio signal received from a first radio network or a second down-converted signal from a radio signal received from a second radio network; a control unit configured to control the RF unit to generate the first down-converted signal during discontinuous reception instances of a continuous packet connection with the first radio network, and to generate the second down-converted signal during paging instances on the second radio network; and a demodulator configured to demodulate the first or the second down-converted signal.

The mobile communications radio receiver may further include: a priority setting unit configured to prioritize either the generation of the first or second down-converted signal if the timings of the reception instances of the continuous packet connection with the first radio network and the paging instances on the second radio network overlap.

A method of demodulating pagings in a mobile communications radio receiver may include: generating a first down-converted signal from a radio signal received from a first radio network; demodulating the first down-converted signal during a discontinuous reception instance of a continuous packet connection with the first radio network; stopping the generation of the first down-converted signal during a discontinuous reception cycle period in which no discontinuous reception instances occur; generating a second down-converted signal from a radio signal received from a second radio network; and demodulating the second down-converted signal during a paging instance on the second radio network.

The method may further include: prioritizing the generation of the first down-converted signal if the timings of the reception instances of the continuous packet connection with the first radio network and the paging instances on the second radio network overlap.

The method may further include: prioritizing the generation of the second down-converted signal if the timings of the reception instances of the continuous packet connection with the first radio network and the paging instances on the second radio network overlap.

A mobile communications receive diversity radio receiver for multiple radio network operation may include: a first antenna and a second antenna; a first RF unit configured to generate a first down-converted signal from a radio signal received at the first antenna; a second RF unit configured to generate a second down-converted signal from a radio signal received at the second antenna; a first receiving unit configured to demodulate the first and second down-converted signals; a second receiving unit configured to demodulate the second down-converted signal; and a control unit configured to control the first RF unit and the second RF unit, and the first receiving unit and the second receiving unit either to operate in a receive diversity mode in which the first and second down-converted signals are both received from a first radio network, or to operate in a non-receive diversity mode in which the first down-converted signal is received from the first radio network and the second down-converted signal is received from a second radio network.

The second receiving unit may include a paging indicator channel demodulator configured to demodulate a paging indicator channel of the second radio network when operated in the non-receive diversity mode.

The control unit may be configured to control the first RF unit and the second RF unit to generate the first down-converted signal from the radio signal received at the first antenna by using a first down-conversion frequency, and to generate the second down-converted signal from the radio signal received at the second antenna by using a second down-conversion frequency, wherein in the receive diversity mode, the first and second down-conversion frequencies are equal.

The control unit may be configured to control the first and second RF units to generate the first down-converted signal from the radio signal received at the first antenna by using a first down-conversion frequency and to generate the second down-converted signal from the radio signal received at the second antenna by using a second down-conversion frequency, wherein in the non-receive diversity mode, the first and second down-conversion frequencies are different.

A method of demodulating signals of multiple radio networks in a mobile communications receive diversity radio receiver may include: operating the receiver in a receive diversity mode to demodulate a signal received at a first antenna and a signal received at a second antenna from a first radio network; and operating the receiver in a non-receive diversity mode to demodulate a signal received at the first antenna from the first radio network and to demodulate a signal received at the second antenna from a second radio network.

When operated in the non-receive diversity mode, the receiver may demodulate a paging indicator channel of the second radio network from the signal received at the second antenna.

The method may further include: down-converting the signal received at the first antenna by using a first down-conversion frequency; and down-converting the signal received at the second antenna by using a second down-conversion frequency, wherein, when operating the receiver in the receive diversity mode, the first and second down-conversion frequencies are equal.

The method may further include: down-converting the signal received at the first antenna by using a first down-conversion frequency; and down-converting the signal received at the second antenna by using a second down-conversion frequency, wherein, when operating the receiver in the non-receive diversity mode, the first and second down-conversion frequencies are different.

A mobile communications radio receiver for multiple radio network operation may include an RF unit for generating a first down-converted signal from a radio signal received from a first radio network and a second down-converted signal from a radio signal received from a second radio network. Further, it includes a first receiver comprising a paging indicator channel demodulator for demodulating a paging indicator channel of the first radio network based on the first down-converted signal, and a second receiver including a pilot channel demodulator for demodulating a pilot channel of the second radio network based on the second down-converted signal. A first data connection is configured to couple paging information contained in the second down-converted signal to an input of the paging indicator channel demodulator of the first receiver.

A mobile communications radio receiver for multiple network operation may be provided. Devices and methods may be provided for mobile communications, and more particularly for receiving and processing signals from multiple radio networks.

A new feature for receivers in mobile communications is Dual-SIM-Dual-Standby (DSDS). It means the UE (user equipment) contains (at least) two SIM (subscriber identity module) cards and registers in (at least) two radio networks. If the UE is in an idle/standby state, it shall be able to receive pagings, i.e. notifications of incoming calls or messages, from both networks.

Another feature for a Dual SIM (DS) phone is to receive a paging on one network during an active connection (e.g. call) on the other network. This feature will be referred to as Dual-SIM-Single-Transport (DSST) in the following.

Still another challenging feature for a DS phone is to have at least two active connections (e.g. calls) in parallel, possibly on two different radio networks. This feature will be referred to as Dual-SIM-Dual-Transport (DSDT) in the following.

A straight-forward approach to have two active connections is to add a complete second receiver chain to the UE. However, this means additional hardware, implying additional chip area and power consumption.

For these and other reasons there is a need for improvements in mobile communication devices and methods.

Figure 17:
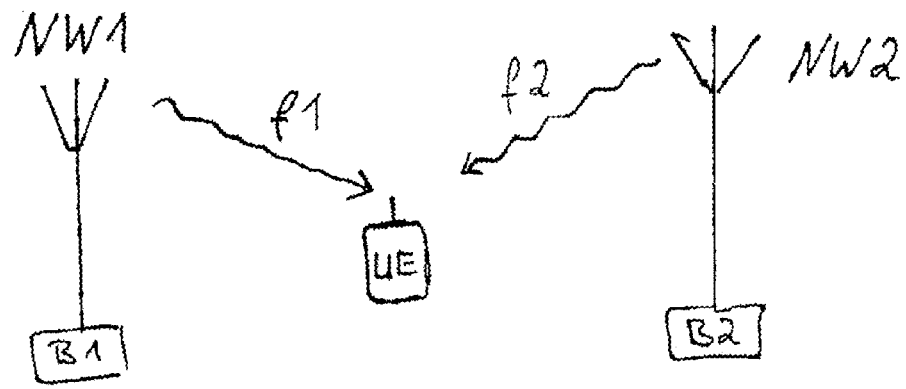
FIG. 17 shows an illustration of a first multiple network scenario for a mobile communications radio receiver.

By way of example, FIG. 17 illustrates a first multiple network scenario for a mobile communications radio receiver (UE). The UE is configured to register in two networks NW1 and NW2. In this embodiment, the networks NW1 and NW2 are operated on different frequency bands f1 and f2. Thus, since the UE must be available to receive pagings from the NW1 operator and the NW2 operator, the UE must be able to tune to frequency bands f1 and f2. By way of example, as shown in FIG. 17, different base stations B1, B2 (i.e. different cells) may be used by the networks NW1 and NW2. However, it is also possible that networks NW1 and NW2 use shared base stations, wherein B1=B2 (i.e. the same cells).

Figure 18:
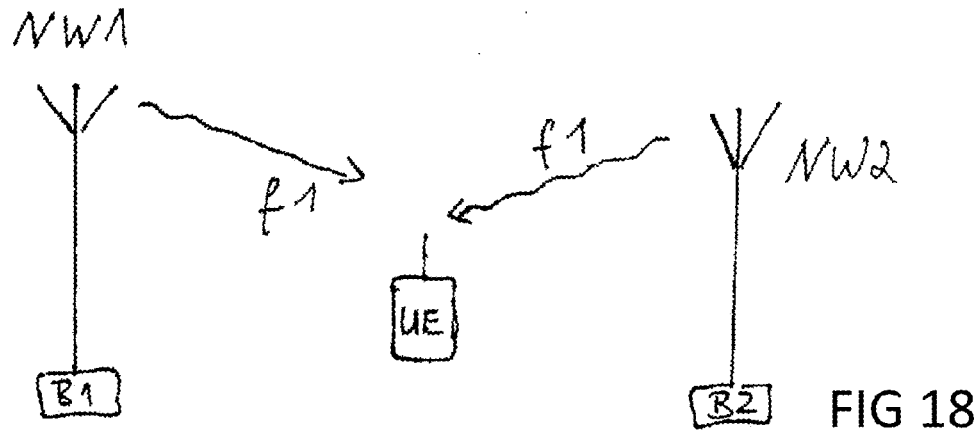
FIG. 18 shows an illustration of a second multiple network scenario for a mobile communications radio receiver.

FIG. 18 illustrates a second multiple network scenario for an UE. The UE is configured to register in two networks NW1 and NW2. In contrast to the scenario illustrated in FIG. 17, the networks NW1 and NW2 are operated on the same frequency band f1. Thus, the UE is available to receive user data (e.g. a voice signal, a data signal etc.) from the NW1 operator and the NW2 operator if tuned to frequency band f1. By way of example, as shown in FIG. 18, different base stations B1, B2 (i.e. different cells) may be used by the networks NW1 and NW2. However, it is also possible that networks NW1 and NW2 use shared base stations, wherein B1=B2 (i.e. the same cells).

Throughout this description, the signals received from the first and second networks NW1, NW2 are different, i.e. they contain different information.

Figure 19:
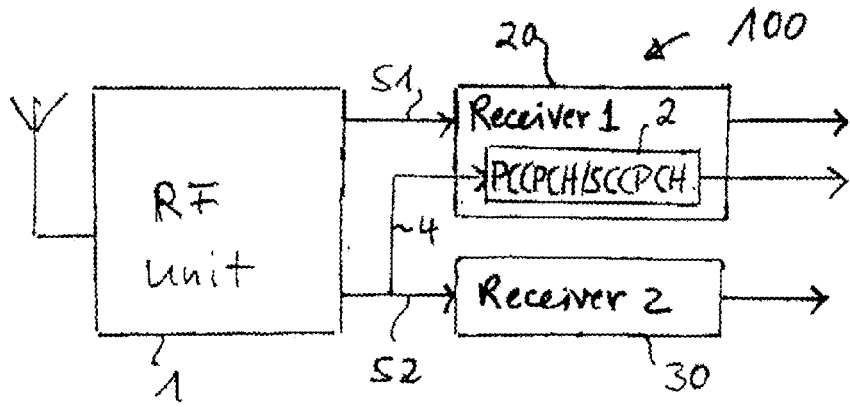
FIG. 19 shows a block diagram illustrating an embodiment of a mobile communications radio receiver.

FIG. 19 is a block diagram illustrating an embodiment of an UE 100. UE 100 comprises an RF unit 1, a first receiver 20 for demodulating a first down-converted signal S1 from a radio signal received from the first radio network NW1 and a second receiver 30 for demodulating a second down-converted signal S2 from a radio signal received from the second radio network NW2. The first receiver 20 comprises, inter alia, a control channel demodulator 2 which may be operated to demodulate a common control channel (e.g. the first and/or second common control channels PCCPCH, SCCPCH) of the first radio network NW1 based on the first down-converted signal S1.

In this embodiment, the control channel demodulator 2 of the first receiver 20 is connected by a data connection 4 to signal S2 which contains the common control channel signal of the second network NW2. This allows for resource sharing between the first and second receivers 20, 30. More specifically, during DSDT, when there is an active connection established on network NW1, i.e. the first receiver 20 is active to demodulate e.g. speech data of a call on network NW1, the control channel resources for demodulating the common control channel(s) of network NW1 of the first receiver 20 are not used continuously. Therefore, the control channel demodulator 2 of the first receiver 20 may be used to demodulate the common control channel signal of the second network NW2 received via data connection 4. In other words, the signal which contains the common control channel of the second network NW2 is routed via data connection 4 to the control channel demodulator 2 of the first receiver 20. Thus, common control data on the second network NW2 may be detected in the first receiver 20. Note that the first receiver 20 may be a full HSUPA (High Speed Uplink Packet Access) receiver which has a common control channel demodulator 2 and the second receiver 30 may be a reduced HSUPA receiver which has no common control channel demodulator. Together, receivers 20 and 30 may be a dual-cell/dual-band HSUPA receiver.

By way of example, if the first receiver 20 has no spare or unused control channel demodulator 2 during an active connection on the first network NW1, the control channel demodulator 2 of the first receiver 20 may be operated in time multiplex to alternatingly demodulate a common control channel of the first network NW1 and a common control channel of the second network NW2. That way, it is possible to have two active connections in parallel. Possible cases are, e.g., to have a voice plan on the first network NW1, a data plan on the second network NW2 and to do the voice call on NW1 concurrently with the data connection on NW2.

If two (or more) active connections are processed on the UE 100, the possibility of conflicts due to requests overlapping in time exists. In this case, a priority decision may be taken, e.g., based on user settings or network settings. By way of example, the priority decision may be based on the number of repetitions and/or the length of the repetition interval of the critical information sent on the first network NW1 and/or the second network NW2 to UE 100. As critical information such as e.g. a message or control information needed to maintain the active connection is usually repeated (e.g., it may be retransmitted if receipt thereof is not acknowledged by the UE 100), the chance is high that, e.g., missing one message or control information due to a conflict does not lead to a loss of connection because the message or control information is repeated.

Thus, depending on the priority settings, either the active connection on the first network NW1 or the active connection on the second network NW2 may be prioritized, and in both cases both operations could be performed (even though the non-prioritized operation may be delayed for a specific time). The priority setting (common control channel demodulation of the first or second network NW1 or NW2 prioritized) may be adapted on the basis of the settings of the two networks NW1, NW2.

FIG. 20 illustrates a more detailed block diagram of one embodiment of UE 100. By way of example, the RF unit 1 may comprise two RF stages 1.1 and 1.2. The RF stages 1.1 and 1.2 may be tuned to different frequency bands in one embodiment. RF stage 1.1 comprises an RF down-converter and provides the first down-converted signal S1 from a radio signal received from network NW1 and RF stage 1.2 comprises an RF down-converter and provides the second down-converted signal S2 from a radio signal received from network NW2. Thus, different down-conversion frequencies may be concurrently used in the RF stages 1.1 and 1.2, respectively. The RF unit 1 may, in one embodiment, be used in a dual-cell/dual-band environment using different frequency bands for transmissions of networks NW1 and NW2 as shown in FIG. 17.

FIG. 20 further illustrates a block diagram of the first and second receivers 20 and 30 contained in UE 100, respectively. As mentioned earlier in conjunction with FIG. 19, the UE 100 may contain a first or main receiver 20 and a second or reduced receiver 30. The main receiver 20, which may be, in one embodiment, an UMTS Re199 receiver, may comprise a number of demodulators, e.g. a CPICH (Common PIlot CHannel) demodulator 21 for pilot demodulation, a PICH (Paging Indicator CHannel) demodulator 22, a PCCPCH (Primary Common Control Physical CHannel) demodulator 2.1, a first SCCPCH (Secondary Common Control Physical CHannel) demodulator 22 for control data demodulation such as, e.g., PCH (Paging CHannel) demodulation in case a PI (Paging Indicator) is detected by the PICH demodulator 22, a second SCCPCH demodulator 2.3, a DPCH1/FDPCH (Dedicated Physical CHannel/Fractional Dedicated Physical CHannel) demodulator 25, two additional DPCH demodulators 26, 27 and an HSUPA (High Speed Uplink Packet Access) demodulator 28 demodulating the corresponding RGCH (Relative Grant CHannel), HICH (Hybrid ARQ Indicator CHannel) and AGCH (Absolute Grant CHannel).

The reduced receiver 30 may contain a number of demodulators which are needed for dual-carrier HSUPA capability, namely a CPICH demodulator 31 for pilot demodulation, a FDPCH demodulator 32 and an HSUPA demodulator 33 demodulating the corresponding RGCH, HICH and AGCH.

It is to be noted that in HSUPA uplink data is transmitted on two different carriers. Thus, to receive the corresponding (different) HSUPA control channels, an UE having HSUPA capability needs a second receiver. To limit semiconductor chip area and power consumption, the second receiver may be stripped down to the functions necessary for the demodulation of the HSUPA control channel on the second carrier. The reduced receiver 30 shown in FIG. 20 is such a second receiver configured for HSUPA control channel demodulation. Note that in one embodiment, this reduced receiver 30 may not contain any DPCH demodulator, since on the second carrier no Re199 data downlink channel DPCH exists. However, it must include a FDPCH (fractional DPCH) demodulator 32. Further, in one embodiment, the reduced receiver 30 does not include a PCCPCH and/or a SCCPCH and/or a PICH demodulator, see UE 100 shown in FIG. 20. This may also apply to the UE 100 illustrated in FIG. 19.

Further, the UE 100 in one embodiment may contain only one single main receiver 20 employing, e.g., demodulators 21, 22, 25, 26, 27, 28, 2.1, 2.2, 2.3 and only one single reduced receiver 30 employing, e.g., demodulators 31 to 33.

Similar to the illustration in FIG. 19, a data connection 4 is used to route signal S2, which contains the PCCPCH, the SCCPCH and the DPCH on the second network NW2, to the main receiver 20, and, more specifically, e.g., to the inputs of the PCCPCH demodulator 2.1, the SCCPCH demodulator 2.2 and the second DPCH demodulator 26 (referred to as DPCH2), respectively.

In one embodiment, the DPCH2 demodulator 26 of the main receiver 20 may be used to demodulate the DPCH of the second radio network NW2 (note that the FDPCH demodulator 32 in the reduced receiver 30 is not operable to demodulate a DPCH). This second DPCH demodulator 26 (as well as a third DPCH demodulator 27 referred to as DPCH3) may exist in the main receiver 20 due to the so-called multicode feature stipulated in the UMTS (Universal Mobile Telecommunications System) specifications, where an active connection may be assigned up to three DPCHs to increase the data rates. However, with the introduction of HSDPA (High Speed Downlink Packet Access), this feature is not or only very rarely used any more. Therefore, one of the spare DPCH demodulators 26, 27 in the main receiver 20 may be used to demodulate the DPCH of the second radio network NW2.

Since the main receiver 20 is operating an active connection, e.g., a call, on the first network NW1 (i.e. the DSDT case is considered), there may not be any completely unused common control channel demodulation resources in the main receiver 20 to be used for demodulating the corresponding channels (e.g. PCCPCH, SCCPCH, etc) of the second radio network NW2 (which can not be demodulated in the reduced receiver 30 because appropriate demodulators operable to demodulate these channels are missing in the reduced receiver 30). However, as described above, a time multiplexing of one or more of these common control channel demodulators between down-converted signal S1 and down-converted signal S2 (coupled to the main receiver 20 via data connection 4) is possible.

The second or reduced receiver 30 may comprise a channel estimator to generate channel estimates based on the second down-converted signal S2. Here, by way of example, the CPICH demodulator 31 may be used as channel estimator. Thus, at an output of the CPICH demodulator 31, channel estimates indicative of the channel characteristics of the communication link associated with the second network NW2 are provided. These channel estimates are routed via a data connection 5 to the main receiver 20.

The channel estimates generated in the reduced receiver 30 and provided via data connection 5 may be input to the PCCPCH demodulator 2.1 and/or the PCCPCH demodulator 2.2 and/or the DPCH2 (or DPCH3) demodulator 26 (or 27) of the main receiver 20 in order to demodulate the PCCPCH and/or the SCCPCH and/or the DPCH on the second carrier (second network NW2). This is possible since these resources are either time-multiplexed or unused during DSDT in UE 100. When rerouting the common control channel information and/or user data of the second network NW2 to the time-multiplexed or unused demodulators 2.1, 2.2, 26, 27 in the main receiver 20, the outputs of these demodulators 2.1, 2.2, 26, 27 have to be interpreted by downstream decoder circuitry (only exemplarily shown for DPCH demodulators 25, 26, 27) to be indicative of the corresponding control channel information or user data on the second network NW2 rather than on the first network NW1.

As known in the art, the receivers 20, 30 are also referred to as inner receivers (IRX) and may, for instance, be implemented by a RAKE receiver. The outputs of the various demodulators 2.1, 2.2, 2.3, 21, 22, 25 to 28 and 31 to 33 are indicated by arrows and may be coupled to individual decoders. In FIG. 20, by way of example and for the sake of illustrative ease, only a channel decoder 40 for decoding the outputs of the DPCH1/FDPCH demodulator 25 and the DPCH2 and DPCH3 demodulators 26, 27 is shown. Such channel decoder 40 is also referred to as outer receiver (ORX) in the art. It is to be noted that the UE 100 may comprise a number of channel decoders (not shown) with each channel decoder being configured to decode a specific channel signal received from one channel demodulator 2.1, 2.2, 2.3, 21, 22, 25 to 28 of the main receiver 20 and from one channel demodulator 31 to 33 of the reduced receiver 30.

FIG. 21 illustrates a more detailed block diagram of one embodiment of UE 100. The configuration and operation of UE 100 shown in FIG. 21 is similar to the configuration and operation of UE 100 shown in FIG. 20. In view of the similarities, the corresponding description to FIG. 20 is applicable to FIG. 21, and reiteration is avoided for the sake of brevity. However, in FIG. 21, the reduced receiver 30 still includes a full DPCH demodulation capability, namely DPCH1/FDPCH demodulator 34. Such reduced receiver 30 may be employed in, e.g., an HSUPA receiver if one reuses a standard DPCH1/FDPCH demodulator unit rather than a (fractional) FDPCH demodulator (although a FDPCH demodulator would be sufficient in HSUPA).

In this case, only one or more of the control channels like PCCPCH and/or SCCPCH of the second radio network NW2 are transferred via data connection 4 to the full main receiver 20. The DPCH of the second radio network NW2 may be demodulated in the DPCH1/FDPCH demodulator 34 of the reduced receiver 30.

Depending on the availability of ORX capability for the reduced receiver 30, the UE 100 may include an additional channel decoder 41 (ORX) for decoding the output of the DPCH1/FDPCH demodulator 34 of the reduced receiver 30 as shown in FIG. 21. Otherwise, the output of the DPCH1/FDPCH demodulator 34 may be routed to an input of the channel decoder 40 (ORX) which is coupled to the DPCH demodulators 25, 26, 27 of the main receiver 20 and is also used to decode the DPCH of the first network NW1 (this case is not illustrated in FIG. 21).

Figure 22:
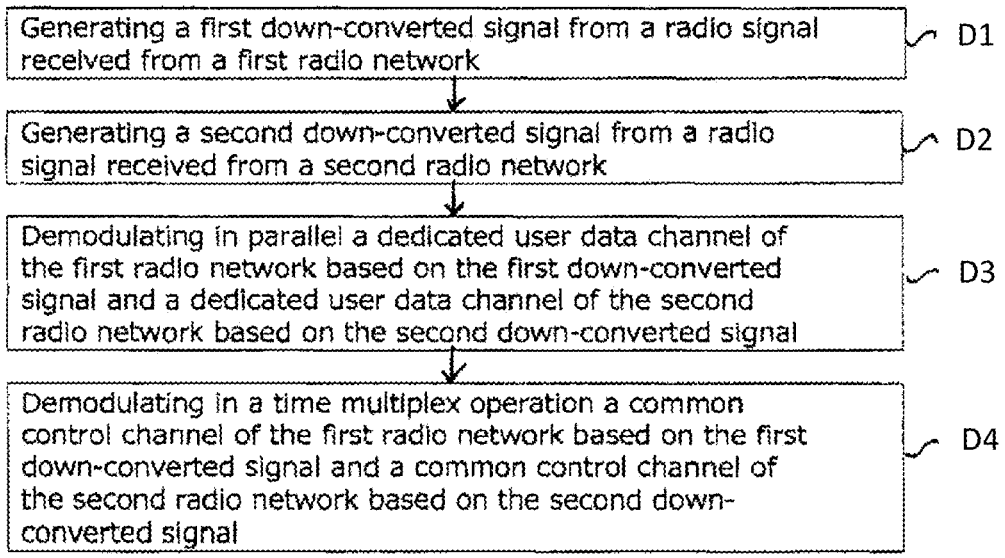
FIG. 22 shows a flowchart of an embodiment of a method of demodulating user data of two radio networks in a mobile communications radio receiver.

FIG. 22 is a flowchart of an embodiment of a method of demodulating user data of the first and second radio network NW1, NW2 in a mobile communications radio receiver. This method may be performed by UE 100 as shown in FIGS. 19 to 21, for example.

As already described above, a first down-converted signal S1 from a radio signal received from a first radio network NW1 and a second down-converted signal S2 from a radio signal received from a second radio network NW2 are generated at D1 and D2, respectively. Thus, there are two active data connections established with the first and second network NW1, NW2. For instance, as shown in FIGS. 20 and 21, RF stages 1.1 and 1.2 may be used to concurrently generate down-converted signals S1 and S2, respectively.

At D3, a dedicated user data channel of the first radio network NW1 based on the first down-converted signal S1 and a dedicated user data channel of the second radio network NW2 based on the second down-converted signal S2 are demodulated in parallel. Exemplary implementations of an UE for concurrently demodulating the two user data channels in respective DPCH demodulators are illustrated by way of example in FIGS. 20 and 21.

At D4, a common control channel of the first radio network NW1 based on the first down-converted signal S1 and a common control channel of the second radio network NW2 based on the second down-converted signal S2 are demodulated in a time multiplex operation. Exemplary implementations of an UE for demodulating the at least two common control channels by shared hardware are illustrated by way of example in FIGS. 20 and 21.

Thus, resource (or hardware) sharing is used between the main and reduced receivers 20, 30, which requires mainly some additional data rerouting and control functions such as e.g. control of the multiplex operation. The control functions may be implemented in firmware. That way, it is possible to receive two DPCH from two different radio networks NW1, NW2 without any major hardware additions to a standard dual-cell HSUPA receiver.

According to another aspect, discontinuous reception (DRX) cycles of continuous packet connectivity (CPC) on the first network NW1 and on the second network NW2 are used to maintain active connections with both networks NW1, NW2 in parallel. FIGS. 23 to 25 are timing diagrams illustrating various scenarios of parallel reception of two CPC on the first network NW1 and on the second network NW2.

With CPC an UE can have an active connection with a network, but if no data is sent the UE only checks in certain intervals if data is available. In between these checks the UE can be turned off to save power. The intervals between these discontinuous reception (DRX) instances in CPC are referred to as CPC DRX cycles. CPC is a recently introduced feature of UMTS.

FIG. 23 illustrates the timing of a first CPC connection between an UE and the first network NW1 and a second CPC connection between the (same) UE and the second network NW2. The time spans of the DRX instances during which the UE checks whether data is available on the first network NW1 are indicated by C1, C2, C3, . . . , Cn, Cn+1 in the upper row of FIG. 23. Similarly, the time spans of the DRX instances during which the UE checks whether data is available on the second network NW2 are indicated by C1, C2, C3, . . . , Cn, Cn+1 in the lower row of FIG. 23. The horizontal axis corresponds to time.

Considering, e.g., the first network NW1, the demodulator of the UE can be turned off during the CPC DRX cycles between the DRX instances C1, C2, C3, . . . , Cn, Cn+1 shown in the upper row of FIG. 23 to save power. Here, it may be temporarily turned on during these periods in order to listen at the DRX instances of the second network NW2 to notifications on available date on the second network NW2 as illustrated in the lower row of FIG. 23.

In one embodiment, if the second network NW2 is operated on a different frequency band f2 than the frequency band f1 used by the first network NW1, see FIG. 17, the UE has to be tuned to the second frequency band f2 upon activation during the CPC DRX cycles of the first network NW1. In another embodiment, if the first and second networks NW1 and NW2 operate on the same frequency band f1, see FIG. 18, the UE may not be tuned to another frequency band when activated during the CPC DRX cycles of the first network NW1 to listen to CPC activity on the second network NW2.

More specifically, FIG. 23 illustrates a case with no CPC activity on both networks NW1, NW2. Further, the (time spans of the) DRX instances C1, C2, C3, . . . , Cn, Cn+1 during which the UE is turned on and both networks NW1, NW2 are checked for available data do not overlap in time. More specifically, the DRX instances C1, C2, C3, . . . , Cn, Cn+1 of the second network NW2 fall completely into the time gaps (DRX cycles) between the DRX instances C1, C2, C3, . . . , Cn, Cn+1 of the first network NW1. Therefore, no conflicts will occur, and both CPC connections can be supported and kept up in parallel by (optional) alternating down-conversion and alternating demodulation of NW1 and NW2 signals.

FIG. 24 illustrates a case of CPC activity (i.e. downlink data transfer beyond the CPC notifications on available data transmitted during the cyclic DRX instances) on the second network NW2. The CPC activity occurs directly after the data available check during DRX instance C2 on the second network NW2 yielded a positive result. Thereafter, a period of CPC activity, i.e. an active continuous downlink user data transfer may occur on network NW2.

Since the DRX instance C3 on network NW1 overlaps with the period of CPC activity on network NW2, it would typically not be possible to listen to the network notification concerning the data available check at DRX instance C3 on network NW1, because there is no DRX cycle anymore on network NW2. However, depending e.g. on the setting of the number of repetitions of data packets on the second network NW2, it might be possible to shortly interrupt the data transfer on the second network NW2 through higher layers (TCP/IP . . . ) and listing instead to possible network notifications on available data at DRX instance C3 of the first network NW1.

Listening to a CPC notification (also referred to as CPC status in the art) on the first network NW1 may require only a few time slots. Therefore, even in the case of a continuous active CPC data connection on the second network NW2 (see FIG. 24), it might be possible to shortly listen to the first network NW1 during the DRX instances C1, C2, . . . , Cn, Cn+1 of the first network NW1, because the lost data packets on the second network NW2 will probably be repeated. Thus, the user would not notice the loss of packets on the second network NW2 connection. Even for a long ongoing data transfer on the second network NW2, the intentional packet dropping due to listening for CPC status on the first network NW1 will only result in a slightly lower throughput of the connection on the second network NW2.

Therefore, still considering the situation illustrated in FIG. 24, a decision may be taken: Either the notification of network NW1 on available data at DRX instance C3 is dropped (because the UE keeps on listening to network NW2) or some data packets on network NW2 are intentionally dropped (because the UE is switched to listen to network NW1 during the DRX instance C3 to demodulate any possible notification of network NW1 on available data).

In other words, a first option is that a notification of the first network NW1 on available data is lost because of the ongoing CPC activity on the second network NW2. Since such notifications are typically repeated several times (e.g., the notification may be repeated after a delay of one or more CPC DRX cycles at DRX instances C4, . . . , Cn, Cn+1), there is a high probability to receive at least the delayed notification. The user probably would not notice the short delay until CPC activity may start on network NW1.

A second option is to prioritize the data available checks at the DRX instances of the first network NW1 over the continuity of the CPC activity on the second network NW2. In this case the notification of available data on network NW1 would always be received, whereas some data packets of the CPC activity on the second network NW2 would be missed. However, missing some data packets of one or a limited number of CPC activities would probably not drop the CPC connection on the second network NW2, because CPC has to take packet loss (e.g. by regular fading) into account. Thus, the drop of some data packets of network NW2 could be compensated by higher layer retransmission. Therefore, missing some data packets of one or a limited number of CPC activities may probably only mean a small degradation in throughput of the data transfer on network NW2.

Therefore, depending on priority settings, either CPC activity on one network or listening to notifications for available data on the other network may be prioritized, and in both cases both operations could be performed (even though the non-prioritized operation may be delayed for a specific time such as one or more CPC DRX cycles or degraded in throughput). The priority setting (CPC activity or DRX notifications prioritized) may be adapted on the basis of the settings of the two networks NW1, NW2. By way of example, the priority setting may depend on the number of repetitions of notifications on available data and/or the number of repetitions of lost data packets during an active CPC connection and/or the length of the CPC DRX cycle.

Of course, as long as the phases of the CPC activity on network NW2 fit into the DRX cycles of network NW1, with an existing but idle CPC connection, both the downlink user data on network NW2 and the CPC status information on network NW1 may be received by (optional) alternating down-conversion and alternating demodulation of NW1 and NW2 signals. In this respect, the case shown in FIG. 24 is similar to the case shown in FIG. 23.

FIG. 25 illustrates a case of concurrent CPC activity (beyond the CPC DRX cycles) on both networks NW1 and NW2. The CPC activity on network NW2 occurs directly after the data available check (positive result) at DRX instance C2 on network NW2. The CPC activity on network NW1 occurs directly after the data available check (also positive result) at DRX instance C3 on network NW1. Since the periods of CPC activities on networks NW1 and NW2 overlap in time, a decision may be taken: Either one CPC connection is dropped (while the other may be continued) or both CPC connections are run with e.g. 50% packet loss rate by alternating the demodulation of the respective user data channels (and, if only one RF stage is provided, by alternating the down-conversion of the respective user data signals). The latter approach may result in a reduced throughput on both networks NW1 and NW2, but both CPC connections may survive due to higher layer retransmissions of lost data packets. This decision (concerning a conflict of concurrent CPC activities on two or more networks) may also be determined based on a priority setting.

Figure 26:
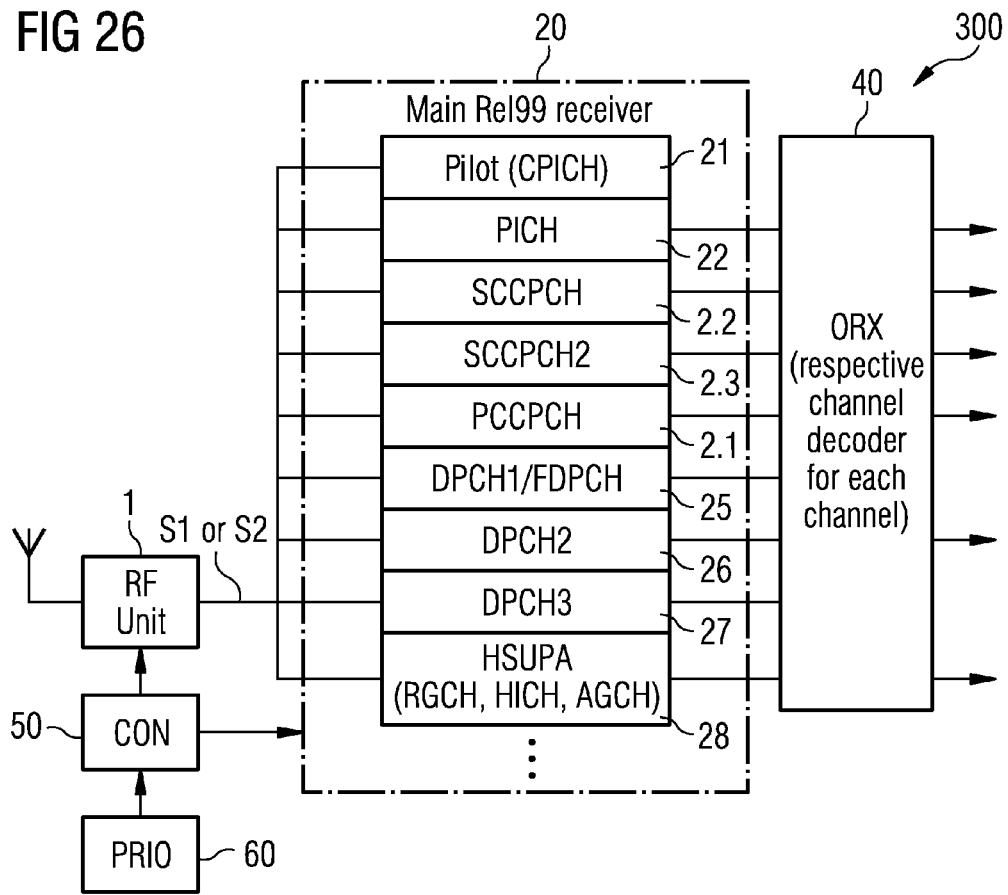
FIG. 26 shows a block diagram illustrating an embodiment of a mobile communications radio receiver.

FIG. 26 illustrates an embodiment of an UE 300 configured to be operated using one or more of the procedures described above with reference to FIGS. 23 to 25. The UE 300 may comprise one single receiver 20 which may be identical to the main receiver 20 shown in FIG. 20 or 21. More specifically, the receiver 20, which may be an UMTS Re199 receiver, may comprise a CPICH demodulator 21 for pilot demodulation, a PICH demodulator 22, a SCCPCH demodulator 2.2, a second SCCPCH demodulator 2.3, a PCCPCH demodulator 2.1, a DPCH1/FDPCH demodulator 25, two additional DPCH demodulators 26, 27 and a HSUPA demodulator 28. The outputs of the various demodulators 2.1, 2.2, 2.3, 21, 22, 25 to 28 are provided to a channel decoder 40 (ORX). The channel decoder 40 may contain for each channel a respective channel decoder to decode the specific channel signal received from one channel demodulator 2.1, 2.2, 2.3, 21, 22, 25 to 28 of the receiver 20.

The UE 300 may comprise a single-band RF unit 1, which can be tuned to the frequency bands f1 and f2 in a sequential manner, but which can not down-convert the frequency bands f1 and f2 concurrently. The single-band RF unit 1 may be controlled by a control unit 50. The control unit 50 is configured to switch the single-band RF unit 1 to either generate the first down-converted signal S1 from the first network NW1 or to generate the second down-converted signal S2 from the second network NW2. The receiver 20 is informed by the control unit 50 on this selection.

In one embodiment the receiver 20 of UE 300 is configured to demodulate only one of the first and second down-converted signals S1, S2 at a time. In particular, for example, only one user data signal is demodulated at a time. Thus, the receiver 20 may include, e.g., only one single CPICH demodulator 21 for pilot demodulation and/or only one single PICH demodulator 22 for PI demodulation and/or only one single PCCPCH demodulator 2.1.

The UE 300 may further comprise a priority selection unit 60. In one embodiment the priority selection unit 60 is configured to select a priority setting in case of conflicting notifications on available data and CPC DRX activity on networks NW1 and NW2 as explained in conjunction with FIG. 24 and/or in case of conflicting CPC DRX activities on networks NW1 and NW2 as explained in conjunction with FIG. 25.

It is to be noted that the control unit 50 and/or the priority selection unit 60 may be implemented in dedicated hardware or in software (firmware). If the control unit 50 and/or the priority selection unit 60 are implemented in software, the embodiments described in FIGS. 23 to 26 may not require any hardware changes to existing UEs. They do not even require a dual-band/dual-cell RF unit 1. The embodiments described in FIGS. 23 to 26 may work on every single-band CPC capable hardware and allow a high chance of supporting two or more CPC connections on two or more networks NW1, NW2, . . . , at the same time. The procedures of operating such single-band CPC capable hardware in accordance with the description herein may be implemented in the firmware of the UE 300.

Figure 27:
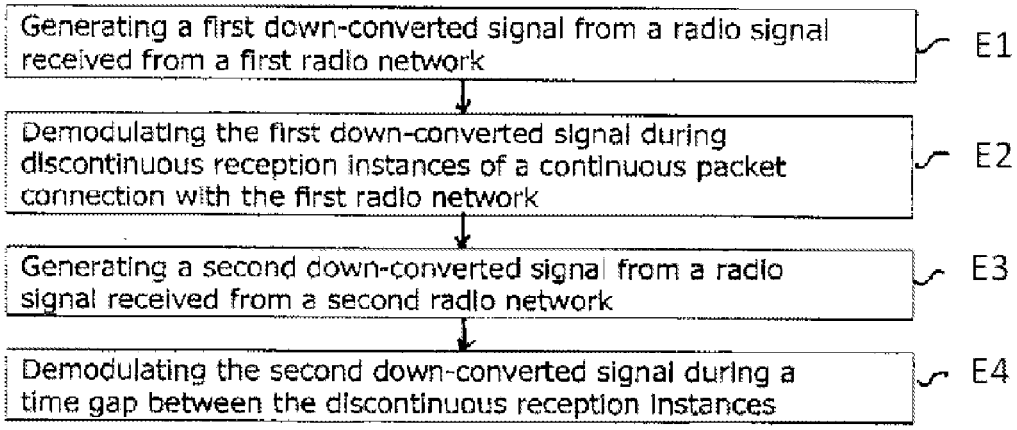
FIG. 27 shows a flowchart of an embodiment of a method of demodulating a signal transmitted by a second network while having a discontinuous reception continuous packet connection established with a first network.

According to FIG. 27, the UE 300 may operate as follows: A first down-converted signal S1 from a radio signal received from a first network NW1 is generated at E1. This first down-converted signal S1 is demodulated during (at least one of) the DRX instances of a CPC connection with the first radio network NW1 at E2. Further, a second down-converted signal S2 from a radio signal received from a second radio network NW2 is generated at E3. This second down-converted signal S2 is demodulated during a time gap between the DRX reception instances.

Thus, during the time gap (DRX cycle period) between consecutive DRX instances, the demodulation and/or generation of the first down-converted signal S1 may be stopped and the demodulation and/or generation of the second down-converted signal S2 from a radio signal received from the second network NW2 may be started.

It is to be noted that the reception of speech or data via two active connections with two networks as described above in all embodiments can be done in any RAT (Radio Access Technology) receivers. By way of example, in case of one 3G (third generation) and one 2G (second generation) connection, each receiver chain may receive separately the corresponding 2G and 3G user data information. Thus, the first network NW1 and/or the second network NW2 may each be a 2G network, a 3G network or e.g. a LTE network, and any combinations of such different networks are feasible.

The methods, aspects and embodiments described herein all relate to DSDT scenarios, where two connections with two different networks NW1, NW2 are considered. Further, also a combination and interaction with other types of Dual-SIM capabilities, for instance DSDS (Dual-SIM-Dual-Standby), where both receiver chains are in a standby mode (i.e. with no active connection on any one of the networks NW1, NW2), or DSST (Dual-SIM-Single-Transport), where a paging from one network may be received while having an active connection with the other network, are possible. Further, the methods, aspects and embodiments described herein can be extended to three or more networks and/or they can be combined.

Further, it is to be noted that in all aspects and embodiments described herein, the UEs 100 and 300 may be configured for using HSDPA and HSUPA.

A mobile communications radio receiver for multiple radio network operation may include: an RF unit configured to generate a first down-converted signal from a radio signal received from a first radio network and a second down-converted signal from a radio signal received from a second radio network; a first receiving unit comprising a user data channel demodulator configured to demodulate a dedicated user data physical channel and a control channel demodulator configured to demodulate a common control data channel of the first radio network based on the first down-converted signal; a second receiving unit comprising a pilot channel demodulator configured to demodulate a pilot channel of the second radio network based on the second down-converted signal; and a first data connection configured to couple control data contained in the second down-converted signal to the control channel demodulator of the first receiving unit.

The first receiving unit may be configured to time multiplex the operation of the control channel demodulator to temporarily demodulate a common control data channel of the first radio network based on the first down-converted signal during a first time segment and to temporarily demodulate a common control data channel of the second radio network received via the first data connection during a second time segment, wherein the first and second time segments are different.

The mobile communications radio receiver may further include: a channel estimator configured to generate channel estimates based on the second down-converted signal, and a second data connection configured to couple the channel estimates from the channel estimator to an input of the first receiving unit.

The channel estimator may include a pilot channel demodulator contained in the second receiving unit.

The second data connection may be configured to couple the channel estimates to an input of the control data demodulator of the first receiving unit.

The second receiving unit may include no control physical channel demodulator for demodulating any common control physical channel.

The second receiving unit may include no user data channel demodulator for demodulating any dedicated user data physical channel.

The RF unit may include: a first RF down-converter configured to generate the first down-converted signal; and a second RF down-converter configured to generate the second down-converted signal.

The mobile communications radio receiver may be an HSUPA receiver.

A method of demodulating user data in a mobile communications radio receiver may include: generating a first down-converted signal from a radio signal received from a first radio network; generating a second down-converted signal from a radio signal received from a second radio network; demodulating in parallel a dedicated user data channel of the first radio network based on the first down-converted signal and a dedicated user data channel of the second radio network based on the second down-converted signal; and demodulating in a time multiplex operation a common control channel of the first radio network based on the first down-converted signal and a common control channel of the second radio network based on the second down-converted signal.

The dedicated user data channels of the first and second radio networks may be demodulated concurrently by at least two DPCH demodulators.

A common control channel of the first radio network and a common control channel of the second radio network may be demodulated by one shared common control channel demodulator.

A mobile communications radio receiver for multiple radio network operation may include: an RF unit configured to generate a first down-converted signal from a radio signal received from a first radio network and a second down-converted signal from a radio signal received from a second radio network, a demodulator configured to demodulate the first down-converter signal and the second down-converted signal; and a control unit configured to control the demodulator to demodulate the first down-converted signal during discontinuous reception instances of a continuous packet connection with the first radio network, and demodulate the second down-converted signal during time gaps between the discontinuous reception instances.

The demodulator may be configured to demodulate only one of the first down-converted signal and the second down-converted signal at a time.

The control unit may be configured to control the RF unit to generate the first down-converted signal during discontinuous reception instances of a continuous packet connection with the first radio network, and generate the second down-converted signal during gaps of the discontinuous reception instances.

The mobile communications radio receiver may further include: a priority setting unit configured to prioritize the demodulation of one of the first down-converted signal and the second down-converted signal if a time of a discontinuous reception instance and a period of data transfer on an active continuous packet connection with the second radio network overlap.

The mobile communications radio receiver may further include: a priority setting unit configured to prioritize either the demodulation of one of the first down-converted signal and the second down-converted signal, or dictate an alternate demodulation of the first and the second down-converted signals if a period of data transfer on an active continuous packet connection with the first radio network and a period of data transfer on an active continuous packet connection with the second radio network overlap.

A method of demodulating signals in a mobile communications radio receiver may include: generating a first down-converted signal from a radio signal received from a first radio network; demodulating the first down-converted signal during at least one discontinuous reception instance of a continuous packet connection with the first radio network; generating a second down-converted signal from a radio signal received from a second radio network; and demodulating the second down-converted signal during a time gap between multiple discontinuous reception instances.

The method may further include: stopping the demodulation of the first down-converted signal during the time gap.

The method may further include: starting the demodulation of the second down-converted signal during the time gap.

The method may further include: prioritizing the demodulation of one of the first down-converted signal and the second down-converted signal if a time of a discontinuous reception instance and a period of data transfer on an active continuous packet connection with the second radio network overlap.

The method may further include: prioritizing the demodulation of one of the first down-converted signal and the second down-converted signal, or dictating an alternate demodulation of the first and the second down-converted signals if a period of data transfer on an active continuous packet connection with the first radio network and a period of data transfer on an active continuous packet connection with the second radio network overlap.

A mobile communications radio receiver for multiple radio network operation may include an RF unit for generating a first down-converted signal from a radio signal received from a first radio network and a second down-converted signal from a radio signal received from a second radio network. Further, the receiver may include a first receiving unit including a user data channel demodulator configured to demodulate a dedicated user data physical channel and a control channel demodulator configured to demodulate a common control data channel of the first radio network based on the first down-converted signal. Still further, the receiver may include a second receiving unit including a pilot channel demodulator configured to demodulate a pilot channel of the second radio network based on the second down-converted signal. A first data connection may be configured to couple control data contained in the second down-converted signal to the control channel demodulator of the first receiving unit.

Devices and methods may be provided for a master-slave concept for Dual-SIM operation and Dual-Band HSPA with two separate receivers.

The next step of possible Dual-SIM scenarios is to have two active connections in parallel, for example on two different networks. This may be denoted as Dual-SIM Dual-Transport (DSDT). Possible use cases are to have a voice plan on one NW (network), a data plan on another NW, and the wish to do voice calls in parallel to a data connection. Or during travelling to another country, a user may desire to have the home SIM (subscriber identity module) to receive calls under the known number, but to do data or voice in parallel on a cheaper (no roaming) local NW of the foreign country.

DSDT may be implemented in the UE by two separate receiver chains. This may be a simple straight-forward approach for DSDT. However, the two separate receiver chains may facilitate also an easier implementation of HSPA extensions like dual-band HSDPA, 4-carrier HSDPA, or dual carrier HSUPA.

The problem occurs now if both, DSDT and the HSDPA extensions, shall run in parallel, i.e. both SIMS request to use the two receivers.

A master-slave concept with a decision unit, which controls the priority in case of a conflict, may be used. The basic system design for this is shown in FIG. 28.

Figure 28:
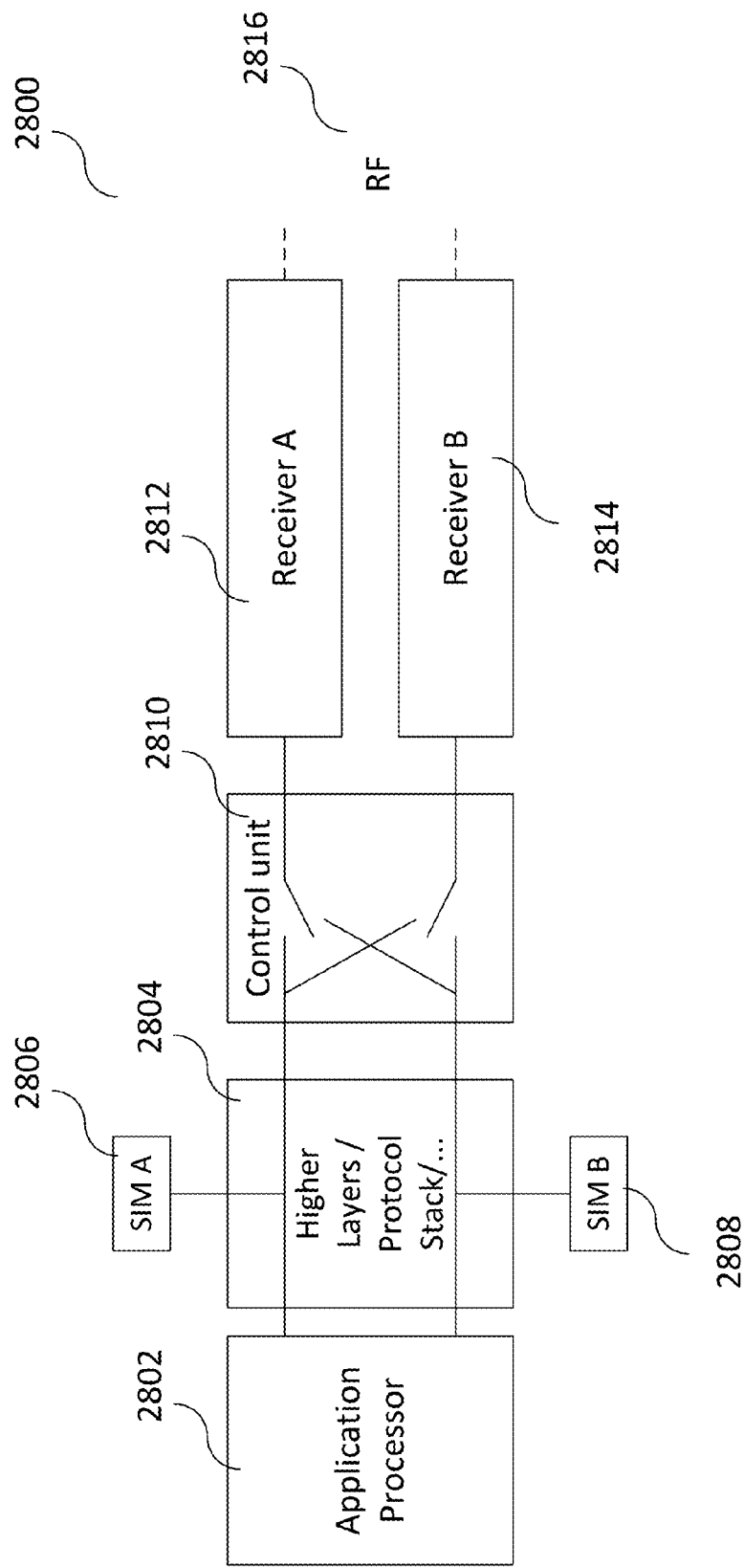
FIG. 28 shows a radio communication device with two receivers.

FIG. 28 shows a radio communication device 2800. An application processor 2802 may be provided. Higher layers (or a protocol stack) 2804 may be used by a first SIM (SIM A) 2806 and a second SIM (SIM B) 2808. A control unit 2810 may control a first receiver (Receiver A) 2812 and a second receiver (Receiver B) 2814, each of which may receive RF (radio frequency) data 2816.

Each receiver, A and B (in other words: the first receiver 2812 and the second receiver 2814), may be able to operate as master and as slave, depending on the configuration it receives from the control unit 2810.

In case of Dual-SIM operation, each receiver may act as a master receiver for the receive path of its SIM.

In case of single-SIM operation with HSPA (High Speed Packet Access) extensions (requiring two receivers) the one receiver acts as a master (for example handling the DPCH (Dedicated Physical Channel) or control on the main carrier) and the other receiver may act as slave.

A conflict may occur when in Dual-SIM operation one SIM (i.e. its respective connection) request the HSPA extensions, which require both receivers, to achieve a higher throughput. In this case the control unit may have to decide if it turns off the Dual-SIM operation and assigns the second receiver to the first SIM or if it rejects the request for the HSPA extension.

This decision may be based on different criteria, for example

- State of second UE: Idle/paging, active connection;
- If yes, type of connection: circuit switched (CS, e.g. voice call) or packet switched (PS, data call);
- If data call, type of data call (for example streaming, file download, or browsing);
- Priorities given by the phone user, for example in a menu on the phone; and/or
- Parameters given by the network operators or phone manufactures.

There may be also override options, for example:

- If the user wants to make a call on the second SIM, but the second receiver is in used by the first SIM, the second receiver may be assigned back to the first SIM;
- It might still be possible (for example like described above) to receive pagings for the second SIM on the second receiver, even if the second receiver is in use by the first SIM. If now a paging is detected on the second SIM, the second receiver may be assigned back to the second SIM to establish the connection and go to DSDT mode.

Figure 29:
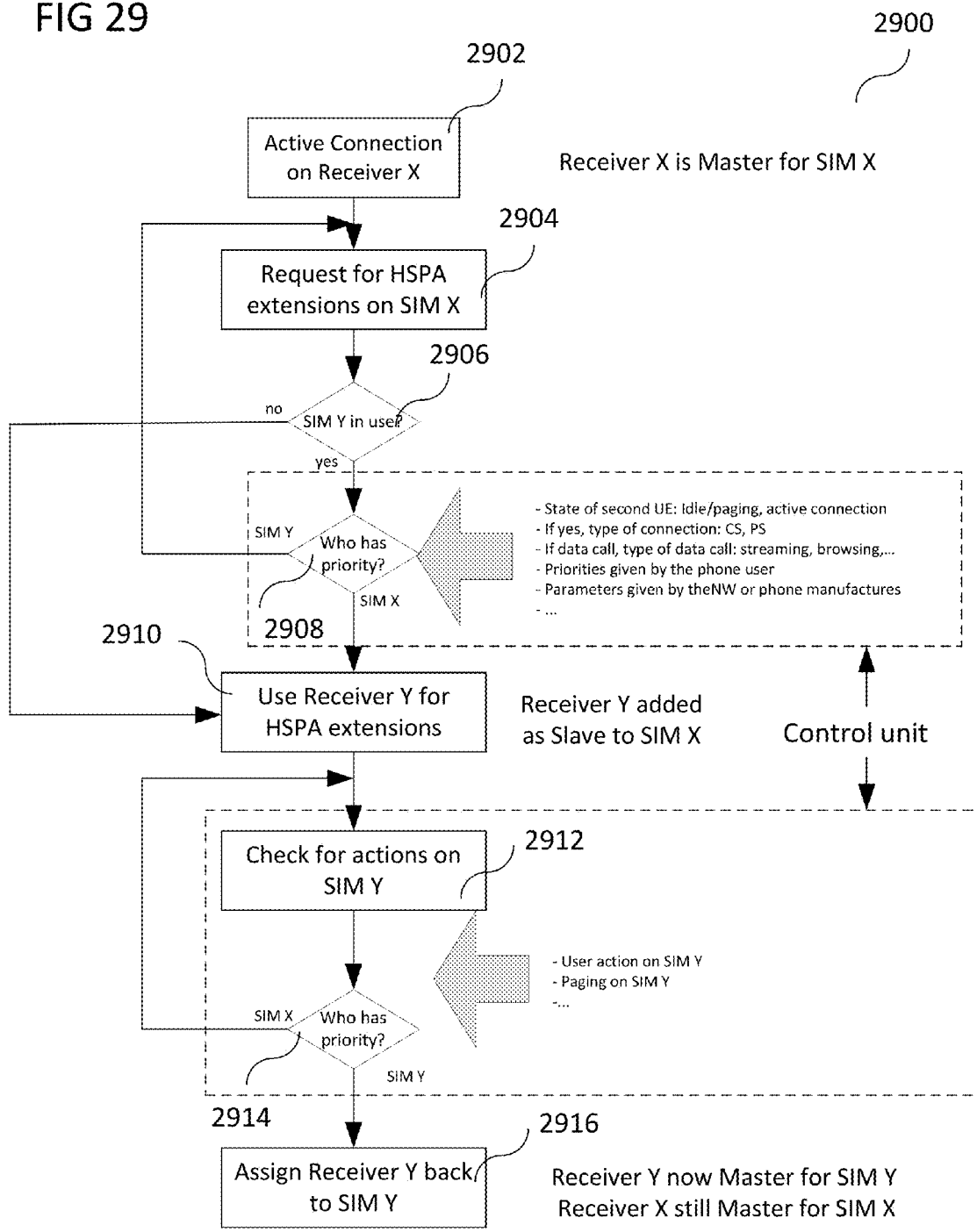
FIG. 29 shows a flow diagram illustrating a method for controlling a radio communication device (for example like shown in FIG. 28)

FIG. 29 shows a flow diagram 2900 illustrating a method for controlling a radio communication device (for example like shown in FIG. 28). In 2902, Receiver X (where X may for example be A or B like described in FIG. 28) may have an active connection. The Receiver X may be the master for SIM X (where X may for example be A or B like described in FIG. 28). In 2904, a request for HSPA extensions on SIM X may occur. In 2906, the radio communication device may determine whether SIM Y (wherein Y may also be A or B, but may be different from X) is in use. In case the radio communication device determines that SIM Y is in use, processing may proceed in 2908. In 2908, the radio communication device may determine who (for example SIM Y or SIM X) has priority. In case the radio communication device determines that SIM Y has priority, processing may proceed in 2904. In case the radio communication device determines that SIM X has priority, processing may proceed in 2910. In the determination in 2908, a control unit of the radio communication device may perform the determination, and may include one or more of the following information as a basis for the determination:

- State of second UE: Idle/paging, active connection;
- If yes, type of connection: CS (circuit switched), PS (packet switched);
- If data call, type of data call: streaming, browsing, . . . ;
- Priorities given by the phone user; and/or
- Parameters given by the NW or phone manufactures.

In 2910, the radio communication device may use Receiver Y (wherein Y may also be A or B, but may be different from X) for HSPA extensions. The radio communication device may add Receiver Y as a slave to SIM X.

In 2912, the radio communication device may check for actions on SIM Y. In 2914, the radio communication device may determine who (for example SIM Y or SIM X) has priority. In case the radio communication device determines that SIM Y has priority, processing may proceed in 2916. In case the radio communication devices determines that SIM X has priority, processing may proceed in 2912. In the determination in 2914, a control unit of the radio communication device may perform the determination, and may include one or more of the following information as a basis for the determination:

- user action on SIM Y; and/or
- paging on SIM Y.

In 2916, the radio communication device may assign Receiver Y back to SIM Y. Receiver Y may now be the master for SIM Y. Receiver X may still be the master for SIM X.

Devices and methods may be provided, for example a control unit which may solve conflicts between Dual-SIM operation and HSDPA extension, which both require two receivers. The decision may be based e.g. on UE states, priorities and user interaction.

For example, more than two receivers may be provided. Then, an assignment of the more than two receivers to the SIMs may be provided, and also more than two receivers may be assigned to one SIM. Furthermore, the control unit may decide on how many receivers to assign to one SIM based on the criteria described above.

Figure 30:
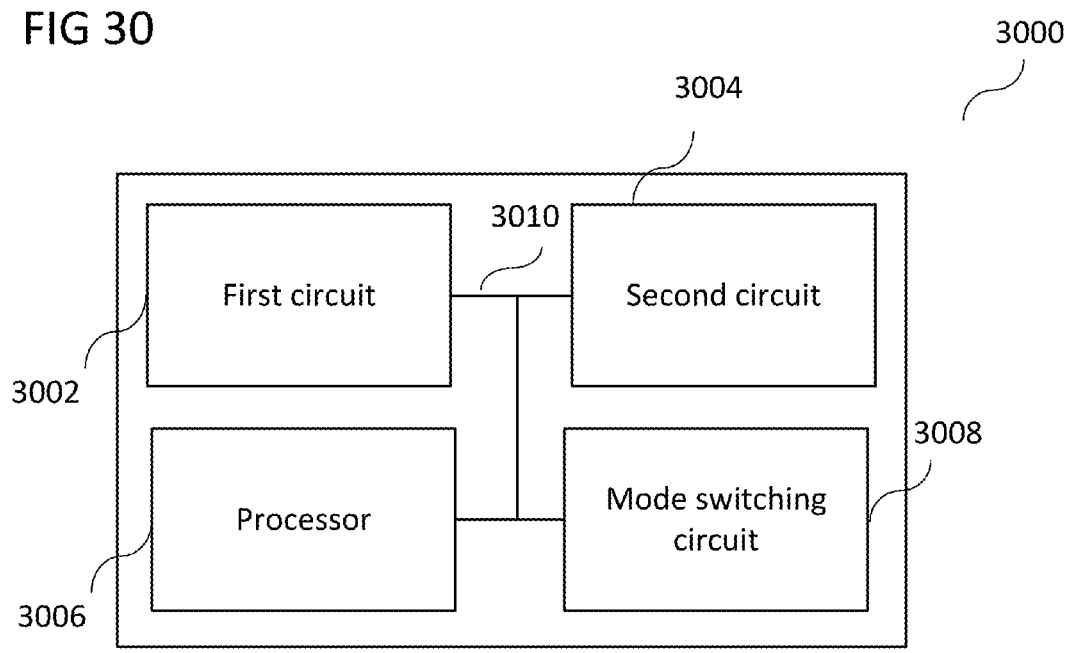
FIG. 30 shows a radio communication device with a mode switching circuit.

FIG. 30 shows a radio communication device 3000. The radio communication device 3000 may include a first circuit 3002. The radio communication device 3000 may further include a second circuit 3004. The radio communication device 3000 may further include a processor 3006 configured to operate the radio communication device in a plurality of operation modes. The plurality of operation modes may include: a first operation mode in which the first circuit 3002 processes received data of a first communication channel independent from the second circuit 3004 and in which the second circuit 3004 processes received data of a second communication channel independent from the first circuit 3002; and a second operation mode in which the first circuit 3002 and the second circuit 3004 jointly process received data of a third communication channel. The radio communication device 3000 may further include a mode switching circuit 3008 configured to switch between the plurality of operation modes. The first circuit 3002, the second circuit 3004, the processor 3006, and the mode switching circuit 3008 may be coupled with each other, e.g. via a connection 3010, for example an optical connection or an electrical connection, such as e.g. a cable or a computer bus or via any other suitable electrical connection to exchange electrical signals.

FIG. 31 shows a radio communication device 3100. The radio communication device 3100 may, similar to the radio communication device 3000 of FIG. 30, include a first circuit 3002. The radio communication device 3100 may, similar to the radio communication device 3000 of FIG. 30, further include a second circuit 3004. The radio communication device 3100 may, similar to the radio communication device 3000 of FIG. 30, further include a processor 3006 configured to operate the radio communication device in a plurality of operation modes. The plurality of operation modes may include: a first operation mode in which the first circuit 3002 processes received data of a first communication channel independent from the second circuit 3004 and in which the second circuit 3004 processes received data of a second communication channel independent from the first circuit 3002; and a second operation mode in which the first circuit 3002 and the second circuit 3004 jointly process received data of a third communication channel. The radio communication device 3100 may, similar to the radio communication device 3000 of FIG. 30, further include a mode switching circuit 3008 configured to switch between the plurality of operation modes. The radio communication device 3100 may further include a first subscriber identity module 3102, like will be described in more detail below. The radio communication device 3100 may further include a second subscriber identity module 3104, like will be described in more detail below. The radio communication device 3100 may further include a switching decision circuit 3106, like will be described in more detail below. The first circuit 3002, the second circuit 3004, the processor 3006, the mode switching circuit 3008, the first subscriber identity module 3102, the second subscriber identity module 3104, and the switching decision circuit 3106 may be coupled with each other, e.g. via a connection 3108, for example an optical connection or an electrical connection, such as e.g. a cable or a computer bus or via any other suitable electrical connection to exchange electrical signals.

The first communication channel may be a communication channel for the first subscriber identity module 3102.

The second communication channel may be a communication channel for the second subscriber identity module 3104.

The third communication channel may be a communication channel for the first subscriber identity module 3102.

The plurality of operation modes may further include a third operation mode in which the first circuit and the second circuit jointly process received data of a fourth communication channel. The fourth communication channel may be a communication channel for the second subscriber identity module 3104.

The first circuit 3002 may include or may be a receiver.

The second circuit 2004 may include or may be a receiver.

The switching decision circuit 3106 may be configured to decide to which operation mode to switch the radio communication device 3100 by the mode switching circuit 3008.

The switching decision circuit 3106 may further be configured to decide based on at least one of the following criteria: a state of the first circuit 3002; a state of the second circuit 3004; a present operation mode of the radio communication device 3100; a kind of the first communication channel; a kind of the second communication channel; a kind of the third communication channel; a pre-defined criterion; a user-defined criterion; a criterion given by a network operation of a network, in which the radio communication device 3100 operates; and/or a criterion given by a manufacturer of the radio communication device 3100.

In the second operation mode, the first circuit 2002 and the second circuit 2004 may jointly process received data of the third communication channel according to a High Speed Packet Access extension. A High Speed Packet Access extension may be any one of a dual-band High Speed Downlink Packet Access, 4-carrier High Speed Downlink Packet Access, or dual carrier High Speed Uplink Packet Access.

The first communication channel may be a communication channel of a first radio access technology.

The second communication channel may be a communication channel of a second radio access technology.

The third communication channel may be a communication channel of the first radio access technology.

The plurality of operation modes may further include a third operation mode in which the first circuit 3002 and the second circuit 3004 jointly process received data of a fourth communication channel. The fourth communication channel may be a communication channel of the second radio access technology.

The first radio access technology may be a Third Generation Project Partnership radio access technology.

The second radio access technology may be a wireless local area network radio access technology.

The first circuit 3002 may include or may be a Fourier transform circuit.

The second circuit 3004 may include or may be a Fourier transform circuit.

Figure 32:
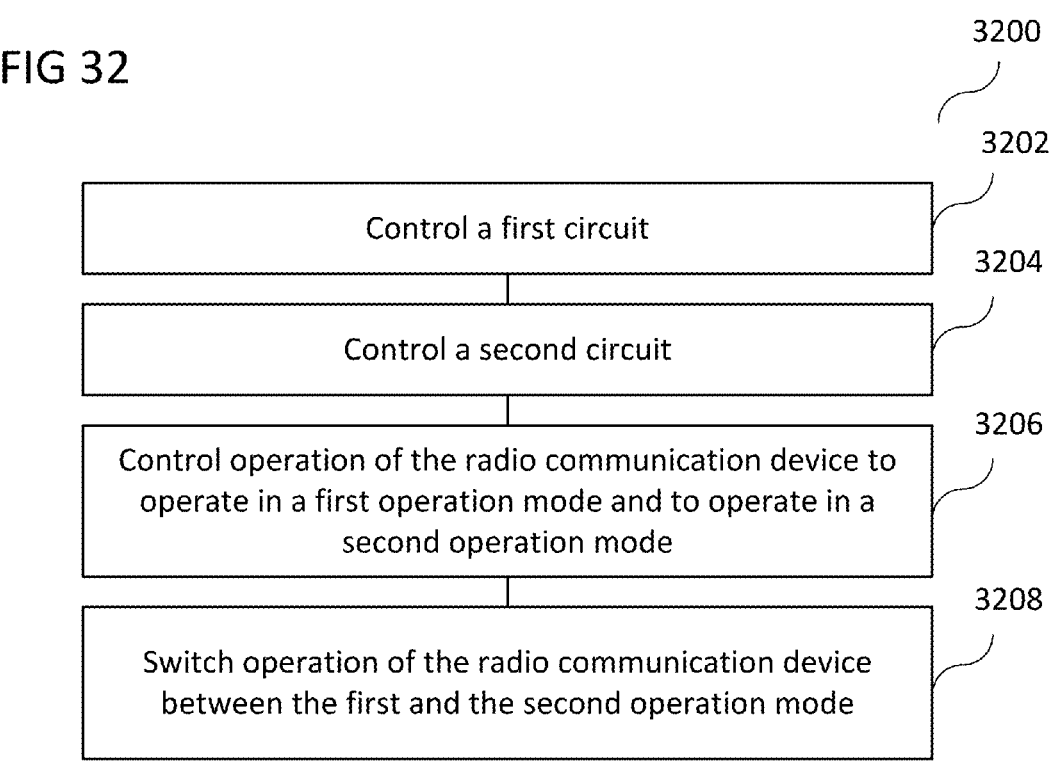
FIG. 32 shows a flow diagram illustrating a method for controlling a radio communication device (for example like shown in FIG. 30 or 31)

FIG. 32 show a flow diagram 3200 illustrating a method for controlling a radio communication device. In 3202, the radio communication device may control a first circuit. In 3204, the radio communication device may control a second circuit. In 3206, a processor of the radio communication device may control operation of the radio communication device to operate in a first operation mode in which the first circuit processes received data of a first communication channel independent from the second circuit and in which the second circuit processes received data of a second communication channel independent from the first circuit; to operate in a second operation mode in which the first circuit and the second circuit jointly process received data of a third communication channel. In 3208, a mode switching circuit of the radio communication device may switch operation of the radio communication device between the first and the second operation modes.

The radio communication device may further control a first subscriber identity module. The first communication channel may be a communication channel for the first subscriber identity module.

The radio communication device may further control a second subscriber identity module. The second communication channel may be a communication channel for the second subscriber identity module.

The third communication channel may be a communication channel for the first subscriber identity module.

Controlling operation of the radio communication device may further include controlling operation of the radio communication device to operate in a third operation mode in which the first circuit and the second circuit jointly process received data of a fourth communication channel. The fourth communication channel may be a communication channel for the second subscriber identity module.

Controlling the first circuit may include or may be controlling a receiver.

Controlling the second circuit may include or may be controlling a receiver.

A switching decision circuit of the radio communication device may decide to which operation mode to switch the radio communication device by the mode switching circuit.

Deciding may be based on at least one of the following criteria: a state of the first circuit; a state of the second circuit; a present operation mode of the radio communication device; a kind of the first communication channel; a kind of the second communication channel; a kind of the third communication channel; a pre-defined criterion; a user-defined criterion; a criterion given by a network operation of a network, in which the radio communication device operates; and/or a criterion given by a manufacturer of the radio communication device.

In the second operation mode, the first circuit and the second circuit may jointly process received data of the third communication channel according to a High Speed Packet Access extension. A High Speed Packet Access extension may be any one of a dual-band High Speed Downlink Packet Access, 4-carrier High Speed Downlink Packet Access, or dual carrier High Speed Uplink Packet Access.

The first communication channel may be a communication channel of a first radio access technology.

The second communication channel may be a communication channel of a second radio access technology.

The third communication channel may be a communication channel of the first radio access technology.

The plurality of operation modes may further include a third operation mode in which the first circuit and the second circuit jointly process received data of a fourth communication channel. The fourth communication channel may be a communication channel of the second radio access technology.

The first radio access technology may be a Third Generation Project Partnership radio access technology.

The second radio access technology may be a wireless local area network radio access technology.

Controlling the first circuit may include or may be performing a Fourier transform.

Controlling the second circuit may include or may be performing a Fourier transform.

Figure 33:
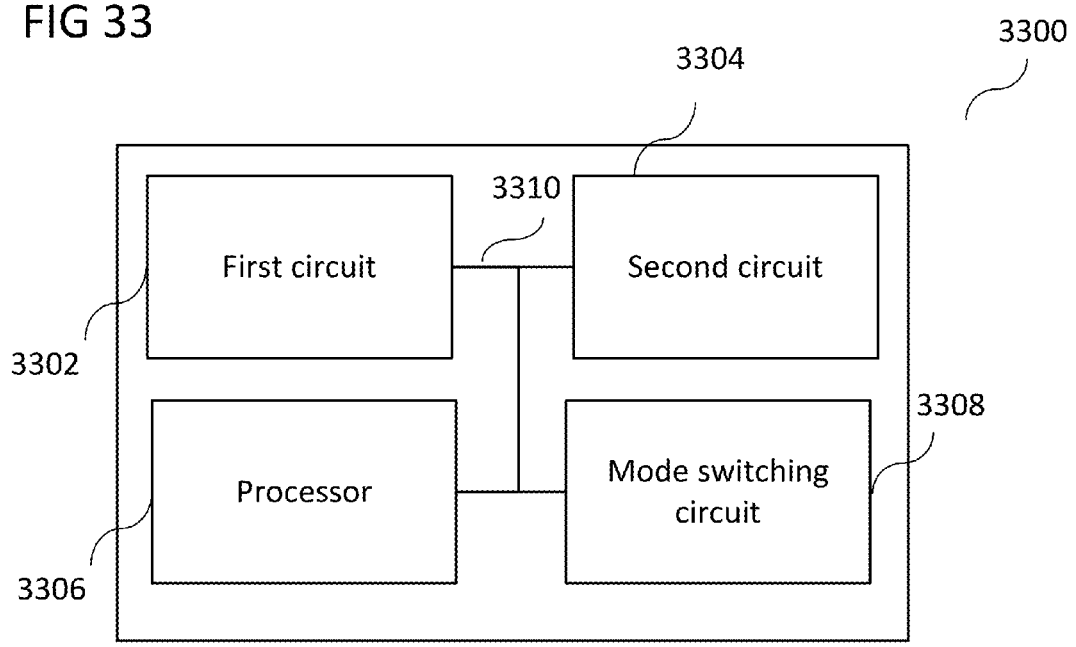
FIG. 33 shows a radio communication device for High Speed Packet Access extensions.

FIG. 33 shows a radio communication device 3300. The radio communication device 3300 may include a first circuit 3302. The radio communication device 3300 may further include a second circuit 3304. The radio communication device 3300 may further include a processor 3306 configured to operate the radio communication device 3300 in a plurality of operation modes. The plurality of operation modes may include: a first operation mode in which the first circuit 3302 processes received data of a first communication channel independent from the second circuit 3304 and in which the second circuit 3304 processes received data of a second communication channel independent from the first circuit 3302; and a second operation mode in which the first circuit 3302 and the second circuit 3304 jointly process received data of a third communication channel according to a High Speed Packet Access extension. The radio communication device 3300 may further include a mode switching circuit 3308 configured to switch between the plurality of operation modes. The first circuit 3302, the second circuit 3304, the processor 3306, and the mode switching circuit 3308 may be coupled with each other, e.g. via a connection 3310, for example an optical connection or an electrical connection, such as e.g. a cable or a computer bus or via any other suitable electrical connection to exchange electrical signals. A High Speed Packet Access extension may be any one of a dual-band High Speed Downlink Packet Access, 4-carrier High Speed Downlink Packet Access, or dual carrier High Speed Uplink Packet Access.

Figure 34:
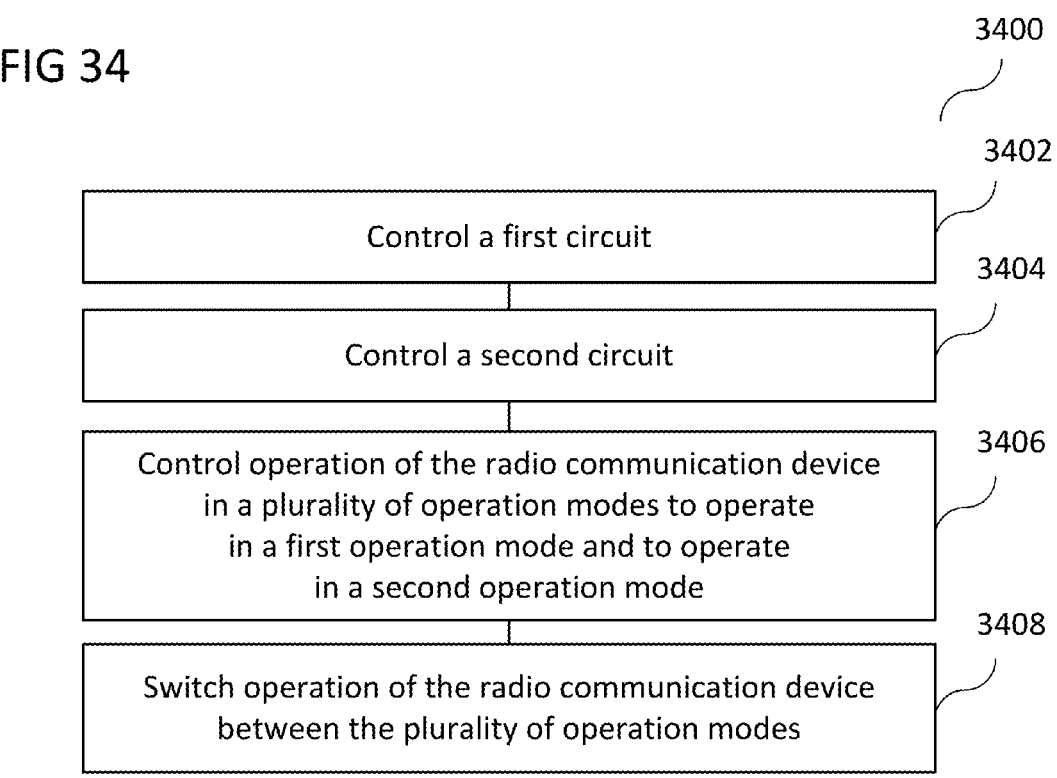
FIG. 34 shows a flow diagram illustrating a method for controlling a radio communication device (for example like shown in FIG. 33).

FIG. 34 show a flow diagram 3400 illustrating a method for controlling a radio communication device. In 3402, the radio communication device may control a first circuit. In 3404, the radio communication device may control a second circuit. In 3406, a processor of the radio communication device may control operation of the radio communication device in a plurality of operation modes to operate in a first operation mode in which the first circuit processes received data of a first communication channel independent from the second circuit and in which the second circuit processes received data of a second communication channel independent from the first circuit; and to operate in a second operation mode in which the first circuit and the second circuit jointly process received data of a third communication channel according to a High Speed Packet Access extension. In 3408, a mode switching circuit of the radio communication device may switch operation of the radio communication device between the plurality of operation modes. A High Speed Packet Access extension may be any one of a dual-band High Speed Downlink Packet Access, 4-carrier High Speed Downlink Packet Access, or dual carrier High Speed Uplink Packet Access.

The first radio access technology and the second radio access technology each may be one of the following radio access technologies (the first radio access technology and the second radio access technology may be different): a Bluetooth radio communication technology, an Ultra Wide Band (UWB) radio communication technology, and/or a Wireless Local Area Network radio communication technology (for example according to an IEEE 802.11 (for example IEEE 802.11n) radio communication standard)), IrDA (Infrared Data Association), Z-Wave and ZigBee, HiperLAN/2 ((HIgh PErformance Radio LAN; an alternative ATM-like 5 GHz standardized technology), IEEE 802.11a (5 GHz), IEEE 802.11g (2.4 GHz), IEEE 802.11n, IEEE 802.11VHT (VHT=Very High Throughput), Worldwide Interoperability for Microwave Access (WiMax) (for example according to an IEEE 802.16 radio communication standard, for example WiMax fixed or WiMax mobile), WiPro, HiperMAN (High Performance Radio Metropolitan Area Network) and/or IEEE 802.16m Advanced Air Interface, a Global System for Mobile Communications (GSM) radio communication technology, a General Packet Radio Service (GPRS) radio communication technology, an Enhanced Data Rates for GSM Evolution (EDGE) radio communication technology, and/or a Third Generation Partnership Project (3GPP) radio communication technology (for example UMTS (Universal Mobile Telecommunications System), FOMA (Freedom of Multimedia Access), 3GPP LTE (Long Term Evolution), 3GPP LTE Advanced (Long Term Evolution Advanced)), CDMA2000 (Code division multiple access 2000), CDPD (Cellular Digital Packet Data), Mobitex, 3G (Third Generation), CSD (Circuit Switched Data), HSCSD (High-Speed Circuit-Switched Data), UMTS (3G) (Universal Mobile Telecommunications System (Third Generation)), W-CDMA (UMTS) (Wideband Code Division Multiple Access (Universal Mobile Telecommunications System)), HSPA (High Speed Packet Access), HSDPA (High-Speed Downlink Packet Access), HSUPA (High-Speed Uplink Packet Access), HSPA+(High Speed Packet Access Plus), UMTS-TDD (Universal Mobile Telecommunications System—Time-Division Duplex), TD-CDMA (Time Division—Code Division Multiple Access), TD-CDMA (Time Division—Synchronous Code Division Multiple Access), 3GPP Rel. 8 (Pre-4G) (3rd Generation Partnership Project Release 8 (Pre-4th Generation)), UTRA (UMTS Terrestrial Radio Access), E-UTRA (Evolved UMTS Terrestrial Radio Access), LTE Advanced (4G) (Long Term Evolution Advanced (4th Generation)), cdmaOne (2G), CDMA2000 (3G) (Code division multiple access 2000 (Third generation)), EV-DO (Evolution-Data Optimized or Evolution-Data Only), AMPS (1G) (Advanced Mobile Phone System (1st Generation)), TACS/ETACS (Total Access Communication System/Extended Total Access Communication System), D-AMPS (2G) (Digital AMPS (2nd Generation)), PTT (Push-to-talk), MTS (Mobile Telephone System), IMTS (Improved Mobile Telephone System), AMTS (Advanced Mobile Telephone System), OLT (Norwegian for Offentlig Landmobil Telefoni, Public Land Mobile Telephony), MTD (Swedish abbreviation for Mobiltelefonisystem D, or Mobile telephony system D), Autotel/PALM (Public Automated Land Mobile), ARP (Finnish for Autoradiopuhelin, "car radio phone"), NMT (Nordic Mobile Telephony), Hicap (High capacity version of NTT (Nippon Telegraph and Telephone)), CDPD (Cellular Digital Packet Data), Mobitex, DataTAC, iDEN (Integrated Digital Enhanced Network), PDC (Personal Digital Cellular), CSD (Circuit Switched Data), PHS (Personal Handy-phone System), WiDEN (Wideband Integrated Digital Enhanced Network), iBurst, Unlicensed Mobile Access (UMA, also referred to as also referred to as 3GPP Generic Access Network, or GAN standard).

While the invention has been particularly shown and described with reference to specific aspects of this disclosure, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

What is claimed is:

1. A radio communication device comprising:
   a first circuit comprising a plurality of demodulators;
   a second circuit comprising one or more demodulators, wherein the number of demodulators of the second circuit is fewer than the plurality of demodulators of the first circuit;
   at least one data connection between the first circuit and the second circuit;
   a processor configured to operate the radio communication device in a plurality of operation modes, wherein the plurality of operation modes comprise:
   a first operation mode in which the first circuit processes received data of a first communication channel independent from the second circuit and in which the second circuit is in an active connection state and processes received data of a second communication channel independent from the first circuit; and
   a second operation mode in which the first circuit and the second circuit jointly process received data of a third communication channel;
   a mode switching circuit configured to switch between the plurality of operation modes; and
   a switching decision circuit configured to decide to which operation mode to switch the radio communication device by the mode switching circuit;
   wherein the first circuit and second circuit are assigned respective priorities; and
   wherein the switching decision circuit is configured to switch to the second operation mode when the priority of the first circuit is higher than the priority of the second circuit.

2. The radio communication device of claim 1, further comprising:
   a first subscriber identity module;
   wherein the first communication channel is a communication channel for the first subscriber identity module.

3. The radio communication device of claim 2, further comprising:
   a second subscriber identity module;
   wherein the second communication channel is a communication channel for the second subscriber identity module.

4. The radio communication device of claim 3,
   wherein the third communication channel is a communication channel for the first subscriber identity module.

5. The radio communication device of claim 4,
   wherein the plurality of operation modes further comprises a third operation mode in which the first circuit and the second circuit jointly process received data of a fourth communication channel;
   wherein the fourth communication channel is a communication channel for the second subscriber identity module.

6. The radio communication device of claim 1, wherein the switching decision circuit is further configured to decide based on at least one criterion selected from a list of criteria consisting of:
   a state of the first circuit;
   a state of the second circuit;
   a present operation mode of the radio communication device;
   a kind of the first communication channel;
   a kind of the second communication channel;
   a kind of the third communication channel;
   a pre-defined criterion;
   a user-defined criterion;
      a criterion given by a network operation of a network, in which the radio communication device operates;
   a criterion given by a manufacturer of the radio communication device.

7. The radio communication device of claim 1,
   wherein in the second operation mode the first circuit and the second circuit jointly process received data of the third communication channel according to a High Speed Packet Access extension.

8. The radio communication device of claim 1,
   wherein the first communication channel is a communication channel of a first radio access technology.

9. The radio communication device of claim 8,
   wherein the second communication channel is a communication channel of a second radio access technology.

10. The radio communication device of claim 1,
    wherein the first circuit comprises a Fourier transform circuit.

11. A method for controlling a radio communication device, the method comprising:
    controlling a first circuit comprising a plurality of demodulators;
    controlling a second circuit comprising one or more demodulators,
    wherein the number of demodulators of the second circuit is fewer than the plurality of demodulators of the first circuit;
    controlling at least one data connection between the first circuit and the second circuit;
    controlling operation of the radio communication device to operate in a first operation mode in which the first circuit processes received data of a first communication channel independent from the second circuit and in which the second circuit is in an active connection state and processes received data of a second communication channel independent from the first circuit; and
    to operate in a second operation mode in which the first circuit and the second circuit jointly process received data of a third communication channel;
    assigning respective priorities to the first circuit and second circuit;
    switching the radio communication device to the second operation mode when the priority of the first circuit is higher than the priority of the second circuit.

12. The method of claim 11, further comprising:
    controlling a first subscriber identity module;
    wherein the first communication channel is a communication channel for the first subscriber identity module.

13. The method of claim 12, further comprising:
controlling a second subscriber identity module;
wherein the second communication channel is a communication channel for the second subscriber identity module.

14. The method of claim 13,
wherein the third communication channel is a communication channel for the first subscriber identity module.

15. The method of claim 14,
wherein controlling operation of the radio communication device further comprises controlling operation of the radio communication device to operate in a third operation mode in which the first circuit and the second circuit jointly process received data of a fourth communication channel;
wherein the fourth communication channel is a communication channel for the second subscriber identity module.

16. The method of claim 11,
wherein deciding is further based on at least one criterion selected from a list of criteria consisting of:
a state of the first circuit;
a state of the second circuit;
a present operation mode of the radio communication device;
a kind of the first communication channel;
a kind of the second communication channel;
a kind of the third communication channel;
a pre-defined criterion;
a user-defined criterion;
a criterion given by a network operation of a network, in which the radio communication device operates;
a criterion given by a manufacturer of the radio communication device.

17. The method of claim 11,
wherein in the second operation mode the first circuit and the second circuit jointly process received data of the third communication channel according to a High Speed Packet Access extension.

18. The method of claim 11,
wherein the first communication channel is a communication channel of a first radio access technology.

19. The method of claim 18,
wherein the second communication channel is a communication channel of a second radio access technology.

20. A radio communication device comprising:
a first circuit comprising a plurality of demodulators;
a second circuit comprising one or more demodulators, wherein the number of demodulators of the second circuit is fewer than the plurality of demodulators of the first circuit;
at least one data connection between the first circuit and the second circuit;
a processor configured to operate the radio communication device in a plurality of operation modes, wherein the plurality of operation modes comprises:
a first operation mode in which the first circuit processes received data of a first communication channel independent from the second circuit and in which the second circuit is in an active connection state and processes received data of a second communication channel independent from the first circuit; and
a second operation mode in which the first circuit and the second circuit jointly process received data of a third communication channel according to a High Speed Packet Access extension; and
a mode switching circuit configured to switch between the plurality of operation modes; and
a switching decision circuit configured to decide to which operation mode to switch the radio communication device by the mode switching circuit;
wherein the first circuit and second circuit are assigned respective priorities; and
wherein the switching decision circuit is configured to switch to the second operation mode when the priority of the first circuit is higher than the priority of the second circuit.

21. The radio communication device of claim 20,
wherein at least one of the first circuit and the second circuit comprises at least one of a receiver and a Fourier transform circuit.

22. A method for controlling a radio communication device, the method comprising:
controlling a first circuit comprising a plurality of demodulators;
controlling a second circuit comprising one or more demodulators, wherein the number of demodulators of the second circuit is fewer than the plurality of demodulators of the first circuit;
controlling at least one data connection between the first circuit and the second circuit;
controlling operation of the radio communication device in a plurality of operation modes to operate in
a first operation mode in which the first circuit processes received data of a first communication channel independent from the second circuit and in which the second circuit is in an active connection state and processes received data of a second communication channel independent from the first circuit; and
to operate in a second operation mode in which the first circuit and the second circuit jointly process received data of a third communication channel according to a High Speed Packet Access extension;
assigning respective priorities to the first circuit and second circuit;
switching the radio communication device when the priority of the first circuit is higher than the priority of the second circuit.

23. The method of claim 22,
wherein at least one of controlling the first circuit and controlling the second circuit comprises at least one of controlling a receiver and performing a Fourier transform circuit.

* * * * *